US010902465B1

(12) United States Patent
Lefkofsky et al.

(10) Patent No.: US 10,902,465 B1
(45) Date of Patent: Jan. 26, 2021

(54) SYSTEMS, APPARATUS, AND METHODS OF PROVIDING PREPURCHASE PROMOTIONS

(71) Applicant: Groupon, Inc., Chicago, IL (US)

(72) Inventors: Eric Lefkofsky, Winnetka, IL (US); Daniel Roarty, Chicago, IL (US); Matthew Joseph Hanson, Chicago, IL (US); Zachary Finley, Chicago, IL (US); David William Kunst, Chicago, IL (US); Feras Karablieh, Issaquah, WA (US)

(73) Assignee: GROUPON, INC., Chicago, IL (US)

( * ) Notice: Subject to any disclaimer, the term of this patent is extended or adjusted under 35 U.S.C. 154(b) by 606 days.

(21) Appl. No.: 14/222,369

(22) Filed: Mar. 21, 2014

(51) Int. Cl.
*G06Q 30/02* (2012.01)
(52) U.S. Cl.
CPC ................... *G06Q 30/0257* (2013.01)
(58) Field of Classification Search
CPC ........... G06Q 30/0207; G06Q 30/0239; G06Q 30/0277; G06Q 30/0208; G06Q 30/0213; G06Q 30/0217; G06Q 30/0257
USPC ........... 705/14.1, 14.11, 14.15, 14.19, 14.39, 705/14.55
See application file for complete search history.

(56) References Cited

U.S. PATENT DOCUMENTS

| | | | |
|---|---|---|---|
| 7,970,713 B1 * | 6/2011 | Gorelik | G06Q 30/0211 705/1.1 |
| 8,244,566 B1 | 8/2012 | Coley et al. | |
| 2003/0204444 A1 * | 10/2003 | Van Luchene | G06Q 30/02 705/16 |
| 2008/0134043 A1 * | 6/2008 | Georgis | H04N 7/10 715/733 |
| 2010/0287103 A1 * | 11/2010 | Mason | G06Q 30/02 705/80 |
| 2011/0112892 A1 | 5/2011 | Tarantino | |
| 2011/0125605 A1 | 5/2011 | Chatter et al. | |
| 2011/0313840 A1 * | 12/2011 | Mason | G06Q 30/02 705/14.35 |

(Continued)

OTHER PUBLICATIONS

How to Write Advertisements that Sell, A.W. Shaw Co., author unknown, dated 1912 (Year: 1912).*

(Continued)

*Primary Examiner* — Scott D Gartland
(74) *Attorney, Agent, or Firm* — Alston & Bird LLP

(57) ABSTRACT

Systems, apparatus, and methods for providing prepurchase promotions to consumers are discussed herein. A prepurchase promotion may refer to preliminary promotional mechanism that may be accepted but is not an actual (e.g., redeemable) promotion until subsequent to merchant approval of one or more promotion parameters. Some embodiments may provide for an apparatus including circuitry configured to: provide a prepurchase impression of a prepurchase promotion to a consumer device, wherein the prepurchase promotion is associated with one or more promotion parameters including a promotional value; receive bid data from the consumer device indicating a consumer-defined accepted value and consumer acceptance of the one or more promotion parameters at the consumer-defined accepted value; and generate a request to offer a promotion including the one or more promotion parameters at the consumer-defined accepted value for transmission to a merchant associated with the prepurchase promotion.

21 Claims, 8 Drawing Sheets

(56) References Cited

U.S. PATENT DOCUMENTS

| | | | | |
|---|---|---|---|---|
| 2012/0078667 | A1* | 3/2012 | Denker | G06Q 10/02 |
| | | | | 705/5 |
| 2012/0150619 | A1* | 6/2012 | Jacob Sushil | G06Q 30/0207 |
| | | | | 705/14.39 |
| 2012/0191509 | A1* | 7/2012 | McMurtrie | G06Q 30/02 |
| | | | | 705/7.36 |
| 2013/0124281 | A1 | 5/2013 | Evans | |
| 2013/0197980 | A1 | 8/2013 | Lerner et al. | |
| 2013/0226710 | A1 | 8/2013 | Plut | |

OTHER PUBLICATIONS

Contract, author unknown, Cornell University Law School, dated Oct. 30, 2012 downloaded Aug. 15, 2018 from https://web.archive.org/web/20121030233240/https://www.law.cornell.edu/wex/contract (Year: 2012).*

Mutual assent, author unknown, Cornell University Law School, dated Oct. 30, 2012 downloaded Aug. 15, 2018 from https://web.archive.org/web/20121030115858/https://www.law.cornell.edu/wex/mutual_assent (Year: 2012).*

Bookeo.com, Groupon and daily deals now integrated in Bookeo, dated Mar. 21, 2011, downloaded from https://www.bookeo.com/news/2011/03/groupon-livingsocial-and-daily-deals-now-integrated-in-bookeo/ on Sep. 14, 2020 (Year: 2011).*

Final Office Action for U.S. Appl. No. 14/222,380 dated Feb. 7, 2017, 13 pages.

In re: Mechie Mkengla; U.S. Appl. No. 14/038,641, titled "Automated Deal Guide User Interface", filed Sep. 26, 2013.

Office Action for U.S. Appl. No. 14/222,380 dated Aug. 3, 2016.

Office Action for U.S. Appl. No. 14/222,380 dated Nov. 19, 2015.

Dean, Joel, Pricing Policies for New Products, Harvard Business Review, dated Nov. 1976, but indicating a first publication in Nov. 1950, downloaded from https://hbr.Org/1976/11/pricing-policies-for-new-products on Aug. 31, 2018 (Year: 1976).

* cited by examiner

800

| | Merchant Quality | | | |
|---|---|---|---|---|
| | 2 Star | 3 Star | 4 Star | 5 Star |
| 0% | 80% | 80% | 75% | 0% |
| 5% | 80% | 80% | 50% | 0% |
| 10% | 80% | 80% | 50% | 0% |
| 15% | 75% | 75% | 40% | 0% |
| 20% | 70% | 70% | 25% | 0% |
| 25% | 65% | 60% | 10% | 0% |
| 30% | 50% | 50% | 5% | 0% |
| 40% | 40% | 25% | 0% | 0% |
| 50% | 25% | 20% | 0% | 0% |

Consumer-Defined Accepted Value (expressed as % discount from Promotional Value)

SYSTEMS, APPARATUS, AND METHODS OF PROVIDING PREPURCHASE PROMOTIONS

FIELD

Embodiments of the invention relate, generally, to providing promotions of merchants to consumers.

BACKGROUND

Merchants offer products, services, and/or experiences (referred to herein as "items") to consumers. Promotional systems may provide promotions for such items to attract business, build consumer loyalty, and improve brand recognition (among other things). Areas for improving current systems have been identified. Through applied effort, ingenuity, and innovation, solutions to improve such systems have been realized and are described herein.

BRIEF SUMMARY

Systems, methods, and computer readable program code are provided to, in general, improve merchant messaging to consumers. Some embodiments may provide for an apparatus including circuitry configured to: provide a prepurchase impression of a prepurchase promotion to a consumer device, wherein the prepurchase promotion is associated with one or more promotion parameters; receive prepurchase approval data from the consumer device indicating consumer acceptance of the one or more parameters; and generate a request to offer a promotion including the one or more promotion parameters for transmission to a merchant associated with the prepurchase promotion.

In some embodiments, the circuitry may be further configured to: in response to receiving the prepurchase approval data, increment a prepurchase count, wherein the prepurchase count indicates a number of consumers that have accepted the one or more promotion parameters; determine a prepurchase threshold value; determine whether the prepurchase count exceeds the prepurchase threshold value; and subsequent to determining that the prepurchase count exceeds the prepurchase threshold value, generate the request to offer a promotion including the one or more promotion parameters.

In some embodiments, the circuitry may be further configured to: determine whether a merchant is associated with an available promotion; in response to determining that the merchant fails to be associated with an available promotion, generate the prepurchase promotion associated with the merchant.

In some embodiments, the one or more parameters may comprise at least an accepted value. The circuitry may be further configured to: determine whether a merchant is associated with an available promotion; in response to determining that the merchant fails to be associated with an available promotion, generate the prepurchase promotion associated with the merchant. In some embodiments, the circuitry may be further configured to: receive payment data from the consumer device; subsequent to generating the request to offer the promotion including the one or more promotion parameters, generate the promotion including the one or more promotion parameters; and subsequent to generating the promotion, facilitate a financial transaction for the promotion based on the payment data and the accepted value.

In some embodiments, the circuitry may be further configured to: subsequent to generating the request to offer the promotion including the one or more promotion parameters, generate the promotion including the one or more promotion parameters; and subsequent to generating the promotion: determine a prepurchase cancellation time; provide an indication of the prepurchase cancellation time to the consumer device; determine whether prepurchase cancellation data indicating cancellation of the acceptance of the one or more parameters has been received from the consumer device prior to the prepurchase cancellation time; and in response to determining that the prepurchase cancellation data has failed to be received by the prepurchase cancellation time, facilitate a financial transaction.

In some embodiments, the circuitry may be further configured to: receive the prepurchase approval data from the consumer device including the payment data; and store the payment data without facilitating the financial transaction until subsequent to generating the promotion.

In some embodiments, the circuitry may be further configured to: subsequent to generating the request to offer the promotion including the one or more promotion parameters, receive promotion approval data from a merchant device indicating merchant approval of the one or more promotion parameters; and in response to receiving the promotion approval data, generate the promotion including the one or more promotion parameters.

In some embodiments, the circuitry may be further configured to: receive payment data from the consumer device; subsequent to receiving the prepurchase approval data, determine whether prepurchase cancellation data indicating cancellation of the acceptance of the one or more parameters has been received from the consumer device; and in response to determining that the prepurchase cancellation data has been received, forego facilitating a financial transaction for the promotion based on the payment data. In some embodiments, the circuitry may be further configured to, in response determining that the prepurchase cancellation data has been received and prior to determining that the prepurchase count exceeds the prepurchase threshold value, decrement the prepurchase count.

In some embodiments, the circuitry maybe further configured to determine the one or more promotion parameters of the promotion including one or more of: an accepted value; a promotional value; and a product, service, or experience offered by the merchant.

In some embodiments, the circuitry may be further configured to: determine a prepurchase threshold time; determine whether the promotion has been generated at the prepurchase threshold time; and in response to determining that the promotion has failed to be generated at the prepurchase threshold time, provide to the consumer device an impression of one or more promotions associated with one or more merchants different from a merchant associated with the prepurchase promotion.

In some embodiments, the circuitry configured to provide the prepurchase impression may include the circuitry being configured to provide an indication of one or more of the prepurchase threshold value and the prepurchase count to the consumer device.

In some embodiments, the circuitry may be further configured to: generate a prepurchase queue including each consumer that has provided prepurchase approval data; determine a promotion availability value indicating a number of instances of the promotion available to consumers; and subsequent to generating the promotion: facilitate a financial transaction for the promotion for at least a portion of consumers within the prepurchase queue without exceeding the promotion availability value, wherein each financial transaction depletes an instance of the promotion available to consumers; determine whether one or more instances of the promotion remain after facilitating the financial transaction for the at least a portion of consumers; and in response to determining that one or more instances of the promotion remain, provide an impression of the promotion to consumers other than the at least a portion of consumers.

In some embodiments, the circuitry may be further configured to, in response to determining that the prepurchase count exceeds the prepurchase threshold value, provide an alert to a display device of the apparatus or a second apparatus.

Some embodiments may provide for a machine-implemented. The method may include: providing, by circuitry, a prepurchase impression of a prepurchase promotion to a consumer device, wherein the prepurchase promotion is associated with one or more promotion parameters; receiving, by the circuitry, prepurchase approval data from the consumer device indicating consumer acceptance of the one or more parameters; and generating, by the circuitry, a request to offer a promotion including the one or more promotion parameters for transmission to a merchant associated with the prepurchase promotion.

In some embodiments, the method may further include: in response to receiving the prepurchase approval data, incrementing a prepurchase count, wherein the prepurchase count indicates a number of consumers that have accepted the one or more promotion parameters; determining a prepurchase threshold value; determining whether the prepurchase count exceeds the prepurchase threshold value; and subsequent to determining that the prepurchase count exceeds the prepurchase threshold value, generating the request to offer a promotion including the one or more promotion parameters.

In some embodiments, the method may further include: determining whether a merchant is associated with an available promotion; in response to determining that the merchant fails to be associated with an available promotion, generating the prepurchase promotion associated with the merchant.

In some embodiments, the one or more parameters comprise at least an accepted value. The method may further include: receiving payment data from the consumer device; subsequent to generating the request to offer the promotion including the one or more promotion parameters, generating the promotion including the one or more promotion parameters; and subsequent to generating the promotion, facilitating a financial transaction for the promotion based on the payment data and the accepted value.

In some embodiments, the method may further include: subsequent to generating the request to offer the promotion including the one or more promotion parameters, generating the promotion including the one or more promotion parameters; and subsequent to generating the promotion: determining a prepurchase cancellation time; providing an indication of the prepurchase cancellation time to the consumer device; determining whether prepurchase cancellation data indicating cancellation of the acceptance of the one or more parameters has been received from the consumer device prior to the prepurchase cancellation time; and in response to determining that the prepurchase cancellation data has failed to be received by the prepurchase cancellation time, facilitating a financial transaction.

In some embodiments, the method may further include: receiving the prepurchase approval data from the consumer device including the payment data; and storing the payment data without facilitating the financial transaction until subsequent to generating the promotion.

In some embodiments, the method may further include: subsequent to generating the request to offer the promotion including the one or more promotion parameters, receiving promotion approval data from a merchant device indicating merchant approval of the one or more promotion parameters; and in response to receiving the promotion approval data, generating the promotion including the one or more promotion parameters.

In some embodiments, the method may further include: receiving payment data from the consumer device; subsequent to receiving the prepurchase approval data, determining whether prepurchase cancellation data indicating cancellation of the acceptance of the one or more parameters has been received from the consumer device; and in response to determining that the prepurchase cancellation data has been received, foregoing facilitation of a financial transaction for the promotion based on the payment data.

In some embodiments, the method may further include, in response determining that the prepurchase cancellation data has been received and prior to determining that the prepurchase count exceeds the prepurchase threshold value, decrementing, by the circuitry, the prepurchase count.

In some embodiments, the method may further include comprising determining, by the circuitry, the one or more promotion parameters of the promotion including one or more of: an accepted value; a promotional value; and a product, service, or experience offered by the merchant.

In some embodiments, the method may further include: determining a prepurchase threshold time; determining whether the promotion has been generated at the prepurchase threshold time; and in response to determining that the promotion has failed to be generated at the prepurchase threshold time, providing to the consumer device an impression of one or more promotions associated with one or more merchants different from a merchant associated with the prepurchase promotion.

In some embodiments, providing the prepurchase impression may include providing an indication of one or more of the prepurchase threshold value and the prepurchase count to the consumer device.

In some embodiments, the method may further include: generating a prepurchase queue including each consumer that has provided prepurchase approval data; determining a promotion availability value indicating a number of instances of the promotion available to consumers; and subsequent to generating the promotion: facilitating a financial transaction for the promotion for at least a portion of consumers within the prepurchase queue without exceeding the promotion availability value, wherein each financial transaction depletes an instance of the promotion available to consumers; determining whether one or more instances of the promotion remain after facilitating the financial transaction for the at least a portion of consumers; and in response to determining that one or more instances of the promotion remain, providing an impression of the promotion to consumers other than the at least a portion of consumers.

In some embodiments, the method may further include, in response to determining that the prepurchase count exceeds the prepurchase threshold value, providing, by the circuitry, an alert to a display device of the apparatus or a second apparatus.

Some embodiments may provide for an apparatus including circuitry configured to: provide a prepurchase impression of a prepurchase promotion to a consumer device, wherein the prepurchase promotion is associated with one or more promotion parameters including a promotional value and the prepurchase impression includes an indication of the promotional value; receive bid data from the consumer device indicating a consumer-defined accepted value and consumer acceptance of the one or more promotion parameters at the consumer-defined accepted value; and generate a request to offer a promotion including the one or more promotion parameters at the consumer-defined accepted value for transmission to a merchant associated with the prepurchase promotion.

In some embodiments, the circuitry may be further configured to: determine whether the merchant is associated with an available promotion; and in response to determining that the merchant fails to be associated with an available promotion, generate the prepurchase promotion associated with the merchant.

In some embodiments, the circuitry may be further configured to: determine a minimum accepted value approved by the merchant associated with the prepurchase promotion; determine whether the consumer-defined accepted value exceeds or matches the minimum accepted value; and subsequent to determining that the consumer-defined accepted value exceeds or matches the minimum accepted value, facilitate a financial transaction for the promotion based on the consumer-defined accepted value.

In some embodiments, the circuitry configured to determine the minimum accepted value may include the circuitry being configured to: provide a bid approval request to a merchant device, the bid approval request including the consumer-defined accepted value; and subsequent to providing the bid approval request, receive bid approval data indicating the minimum accepted value from the merchant device.

In some embodiments, the circuitry may be further configured to: determine a relationship between consumer-defined accepted values and bid acceptance likelihood values based on historical bid approval data; determine a bid acceptance likelihood value associated with the consumer-defined accepted value based at least in part on the relationship between consumer-defined accepted values and bid acceptance likelihood values; and subsequent to receiving the bid data from the consumer device indicating the consumer-defined accepted value, provide an indication of the bid acceptance likelihood value to the consumer device.

In some embodiments, the circuitry may be further configured to: determine a relationship between consumer-defined accepted values and bid acceptance likelihood values based on historical bid approval data; determine a recommended consumer-defined accepted value based at least in part on the relationship between consumer-defined accepted values and bid acceptance likelihood values; and provide an indication of the recommended consumer-defined accepted value to the consumer device.

In some embodiments, the circuitry may be further configured to: determine a prepurchase threshold time; determine whether the consumer-defined accepted value has been approved by the merchant at the prepurchase threshold time; and in response to determining that the consumer-defined accepted value has failed to be approved by the merchant at the prepurchase threshold time, provide to the consumer device one or more of: a request for a second consumer-defined accepted value that is greater than the consumer-defined accepted value; a request for approval of a second prepurchase threshold time that is subsequent to the prepurchase threshold time; and an option to cancel the consumer acceptance of the one or more promotion parameters at the consumer-defined accepted value.

In some embodiments, the circuitry may be further configured to: receive payment data from the consumer device; generate the promotion including the one or more promotion parameters; and subsequent to generating the promotion, facilitate the financial transaction for the promotion based on the payment data and the consumer-defined accepted value.

In some embodiments, the circuitry may be further configured to: determine a minimum accepted value approved by the merchant associated with the prepurchase promotion; and store the payment data without facilitating the financial transaction until subsequent to determining that the consumer-defined accepted value exceeds or matches the minimum accepted value.

In some embodiments, the circuitry may be further configured to: determine a minimum accepted value approved by the merchant associated with the prepurchase promotion; generate a prepurchase queue including each consumer that has provided bid data indicating a consumer-defined accepted value that exceeds or matches the minimum accepted value; determine a promotion availability value indicating a number of instances of the promotion available to consumers at the consumer-defined accepted value; and subsequent to generating the promotion: facilitate a financial transaction for the promotion for at least a portion of consumers within the prepurchase queue without exceeding the promotion availability value, wherein each financial transaction depletes an instance of the promotion available to consumers; determine whether one or more instances of the promotion remain after facilitating the financial transaction for the at least a portion of consumers; and in response to determining that one or more instances of the promotion remain, provide an impression of the promotion to consumers other than the at least a portion of consumers.

In some embodiments, the circuitry may be further configured to: determine an expected revenue value of the prepurchase promotion based on consumer-defined accepted values and bid acceptance likelihood values associated with the consumer-defined accepted values; determine an expected revenue threshold value; determine whether the expected revenue value exceeds the expected revenue threshold value; and in response to determining that the expected revenue value exceeds the expected revenue threshold value, provide an alert to a display device of the apparatus or a second apparatus.

In some embodiments, the circuitry may be further configured to: determine historical data associated with the prepurchase promotion indicating consumer-defined accepted values, bid counts associated with the consumer-defined accepted values, and bid acceptance likelihood values associated with the consumer-defined accepted values; determine an expected revenue value of the prepurchase promotion based on at least a portion of the historical data; determine a revenue threshold value; determine whether the expected revenue value exceeds the revenue threshold value; and in response to determining that the expected revenue value exceeds the revenue threshold value: determine a merchant revenue share value based on the expected revenue value; and provide an indication of the merchant revenue share value to a merchant device.

Some embodiments may provide for a machine-implemented method. The method may include: providing, by circuitry, a prepurchase impression of a prepurchase promotion to a consumer device, wherein the prepurchase promotion is associated with one or more promotion parameters including a promotional value and the prepurchase impression includes an indication of the promotional value; receiving, by the circuitry, bid data from the consumer device indicating a consumer-defined accepted value and consumer acceptance of the one or more promotion parameters at the consumer-defined accepted value; and generating, by the circuitry, a request to offer a promotion including the one or more promotion parameters at the consumer-defined accepted value for transmission to a merchant associated with the prepurchase promotion.

In some embodiments, the method may further include: determining whether the merchant is associated with an available promotion; in response to determining that the merchant fails to be associated with an available promotion, generating the prepurchase promotion associated with the merchant.

In some embodiments, the method may further include: determining a minimum accepted value approved by the merchant associated with the prepurchase promotion; determining whether the consumer-defined accepted value exceeds or matches the minimum accepted value; and subsequent to determining that the consumer-defined accepted value exceeds or matches the minimum accepted value, facilitating a financial transaction for the promotion based on the consumer-defined accepted value.

In some embodiments, determining the minimum accepted value may include: providing a bid approval request to a merchant device, the bid approval request including the consumer-defined accepted value; and subsequent to providing the bid approval request, receiving bid approval data indicating the minimum accepted value from the merchant device.

In some embodiments, the method may further include: determining a relationship between consumer-defined accepted values and bid acceptance likelihood values based on historical bid approval data; determining a bid acceptance likelihood value associated with the consumer-defined accepted value based at least in part on the relationship between consumer-defined accepted values and bid acceptance likelihood values; and subsequent to receiving the bid data from the consumer device indicating the consumer-defined accepted value, providing an indication of the bid acceptance likelihood value to the consumer device.

In some embodiments, the method may further include: determining a relationship between consumer-defined accepted values and bid acceptance likelihood values based on historical bid approval data; determining a recommended consumer-defined accepted value based at least in part on the relationship between consumer-defined accepted values and bid acceptance likelihood values; and providing an indication of the recommended consumer-defined accepted value to the consumer device.

In some embodiments, the method may further include: determining a prepurchase threshold time; determining whether the consumer-defined accepted value has been approved by the merchant at the prepurchase threshold time; and in response to determining that the consumer-defined accepted value has failed to be approved by the merchant at the prepurchase threshold time, providing to the consumer device one or more of: a request for a second consumer-defined accepted value that is greater than the consumer-defined accepted value; a request for approval of a second prepurchase threshold time that is subsequent to the prepurchase threshold time; and an option to cancel the consumer acceptance of the one or more promotion parameters at the consumer-defined accepted value.

In some embodiments, the method may further include: receiving payment data from the consumer device; generating the promotion including the one or more promotion parameters; and subsequent to generating the promotion, facilitating the financial transaction for the promotion based on the payment data and the consumer-defined accepted value.

In some embodiments, the method may further include: determining a minimum accepted value approved by the merchant associated with the prepurchase promotion; and storing the payment data without facilitating the financial transaction until subsequent to determining that the consumer-defined accepted value exceeds or matches the minimum accepted value.

In some embodiments, the method may further include: determining a minimum accepted value approved by the merchant associated with the prepurchase promotion; generating a prepurchase queue including each consumer that has provided bid data indicating a consumer-defined accepted value that exceeds or matches the minimum accepted value; determining a promotion availability value indicating a number of instances of the promotion available to consumers at the consumer-defined accepted value; and subsequent to generating the promotion: facilitating a financial transaction for the promotion for at least a portion of consumers within the prepurchase queue without exceeding the promotion availability value, wherein each financial transaction depletes an instance of the promotion available to consumers; determining whether one or more instances of the promotion remain after facilitating the financial transaction for the at least a portion of consumers; and in response to determining that one or more instances of the promotion remain, providing an impression of the promotion to consumers other than the at least a portion of consumers.

In some embodiments, the method may further include: determining an expected revenue value of the prepurchase promotion based on consumer-defined accepted values and bid acceptance likelihood values associated with the consumer-defined accepted values; determining an expected revenue threshold value; determining whether the expected revenue value exceeds the expected revenue threshold value; and in response to determining that the expected revenue value exceeds the expected revenue threshold value, providing an alert to a display device of the apparatus or a second apparatus.

In some embodiments, the method may further include: determining historical data indicating consumer-defined accepted values, bid counts associated with the consumer-defined accepted values, and bid acceptance likelihood values associated with the consumer-defined accepted values; determining an expected revenue value of the prepurchase promotion based on at least a portion of the historical data; determining a revenue threshold value; determining whether the expected revenue value exceeds the revenue threshold value; and in response to determining that the expected revenue value exceeds the revenue threshold value: determining a merchant revenue share value based on the expected revenue value; and providing an indication of the merchant revenue share value to a merchant device.

Some embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1:
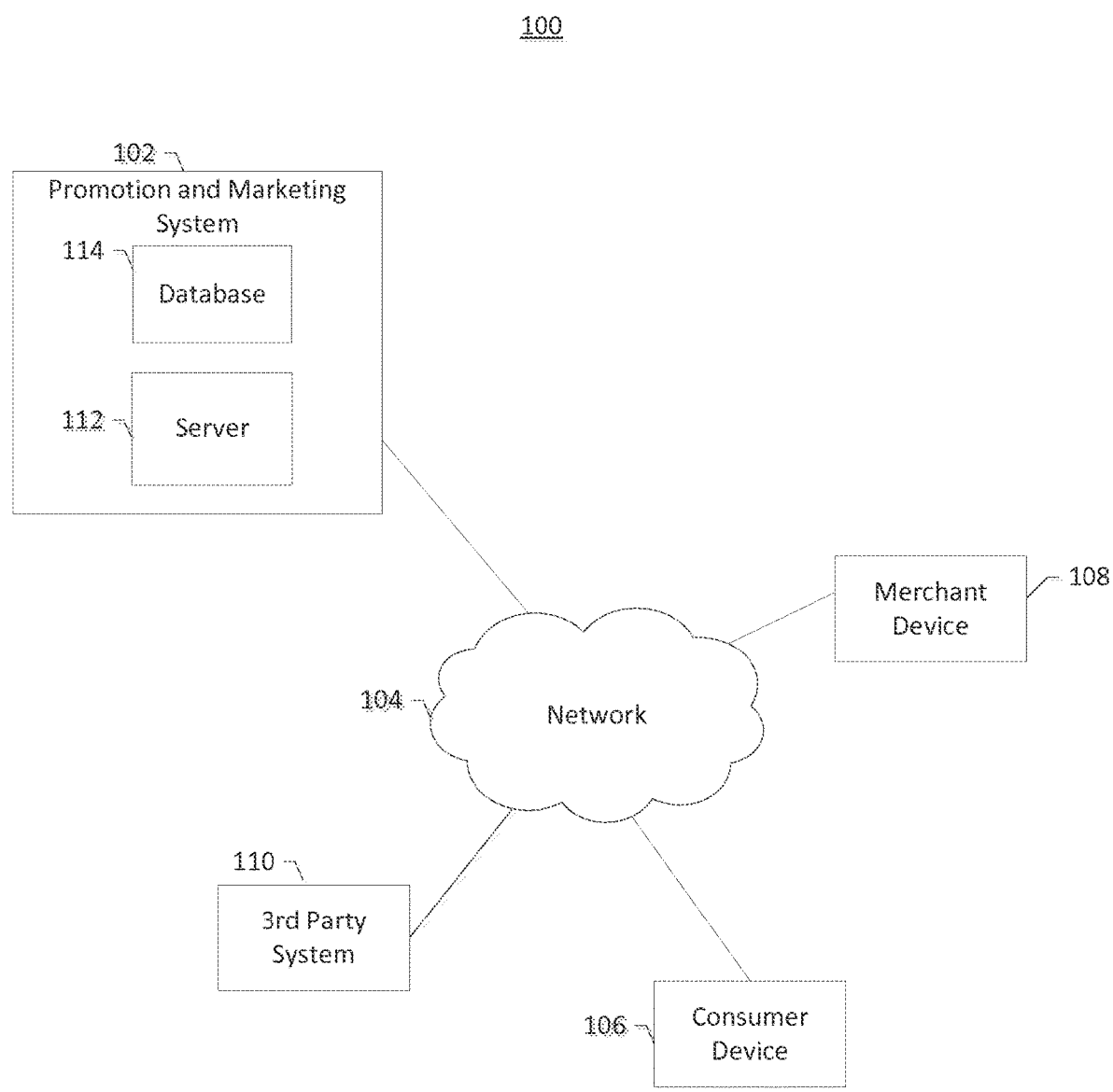
Figure 2:
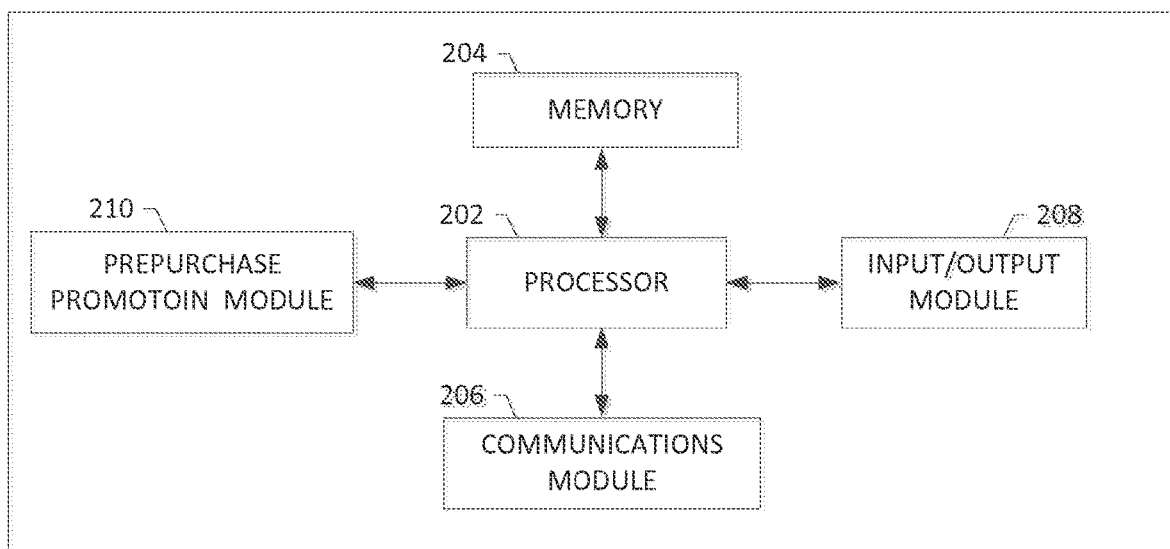

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of an example of circuitry in accordance with some embodiments.

Figure 3:
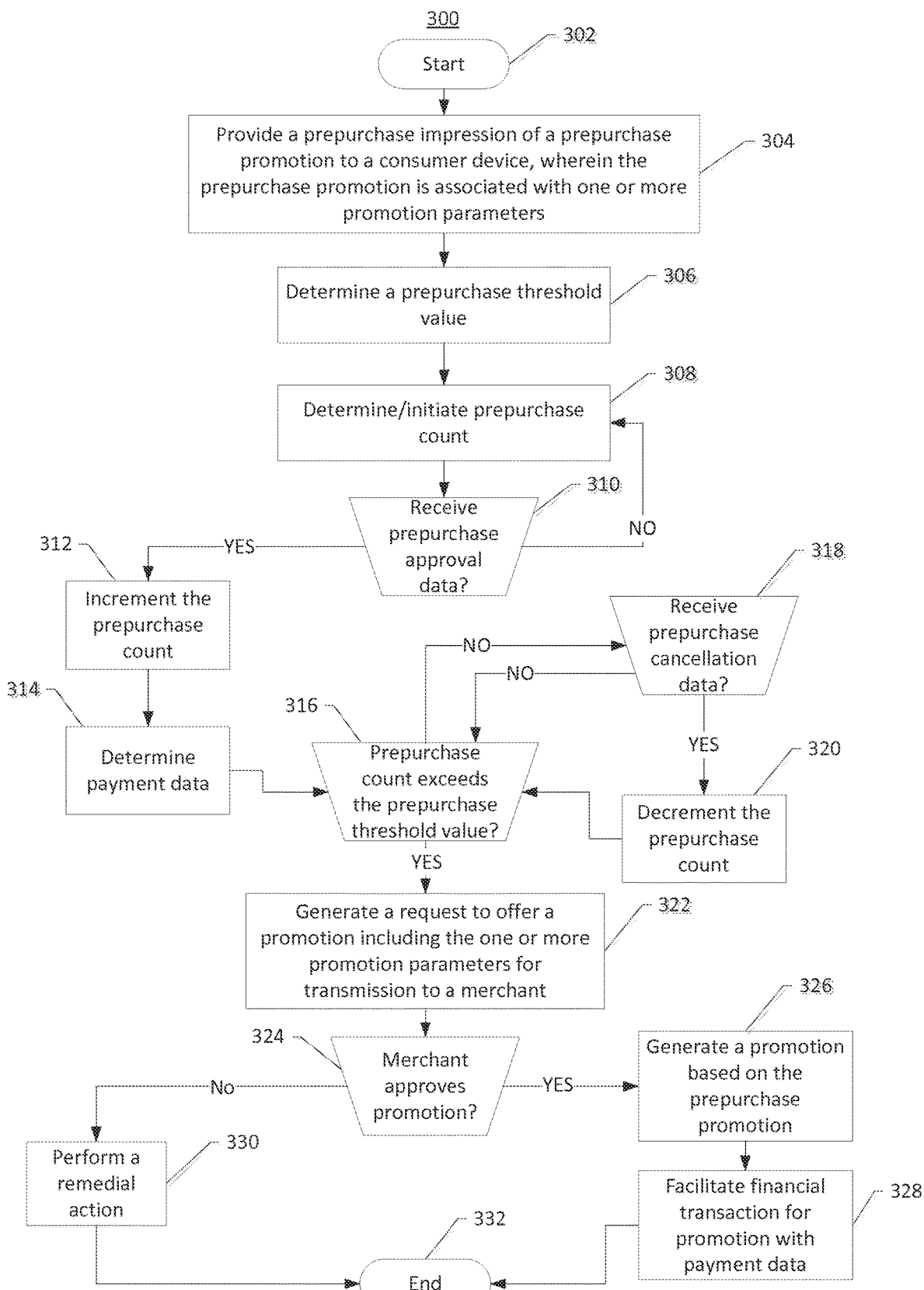
Figure 4:
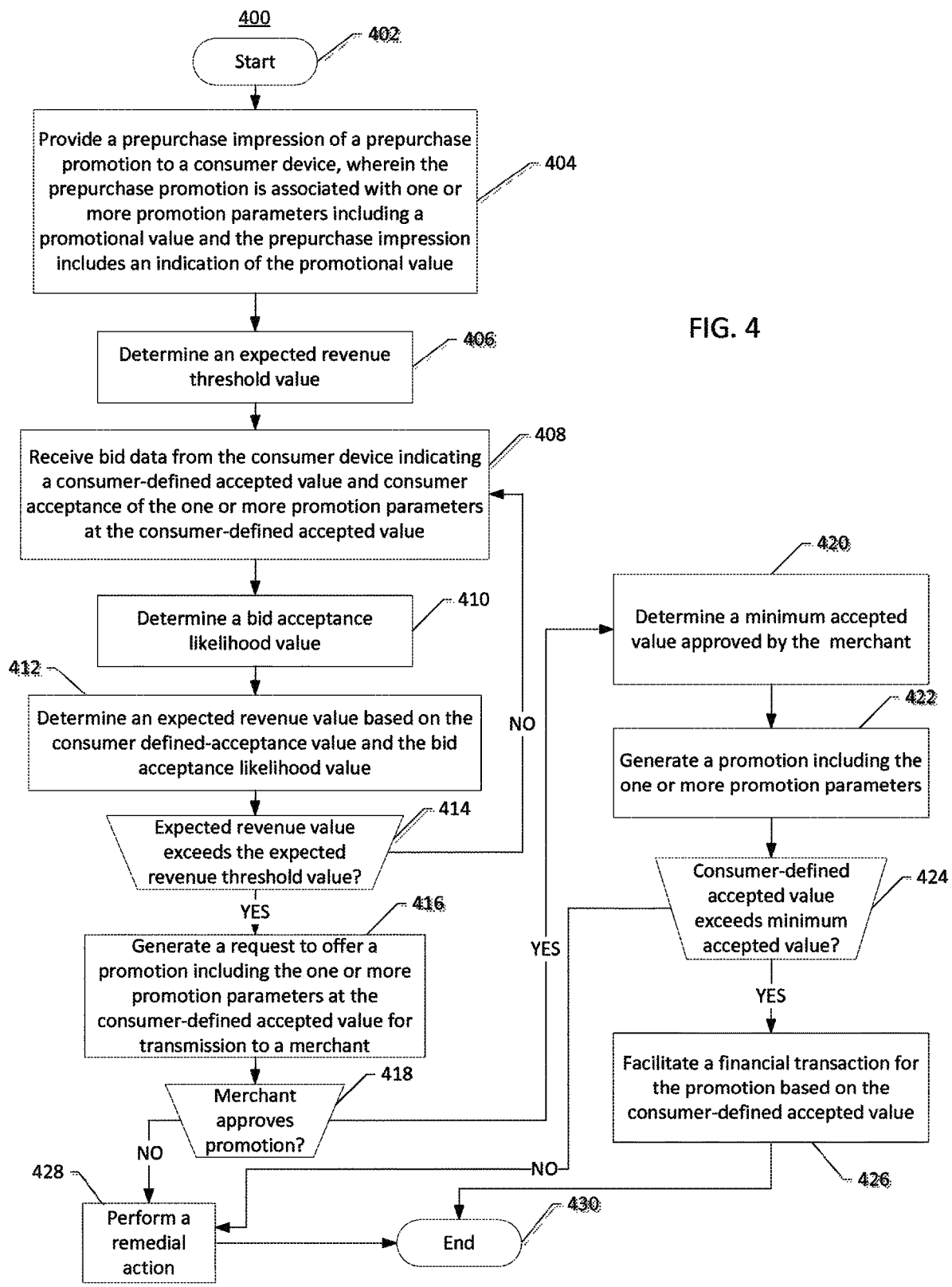
Figure 5:
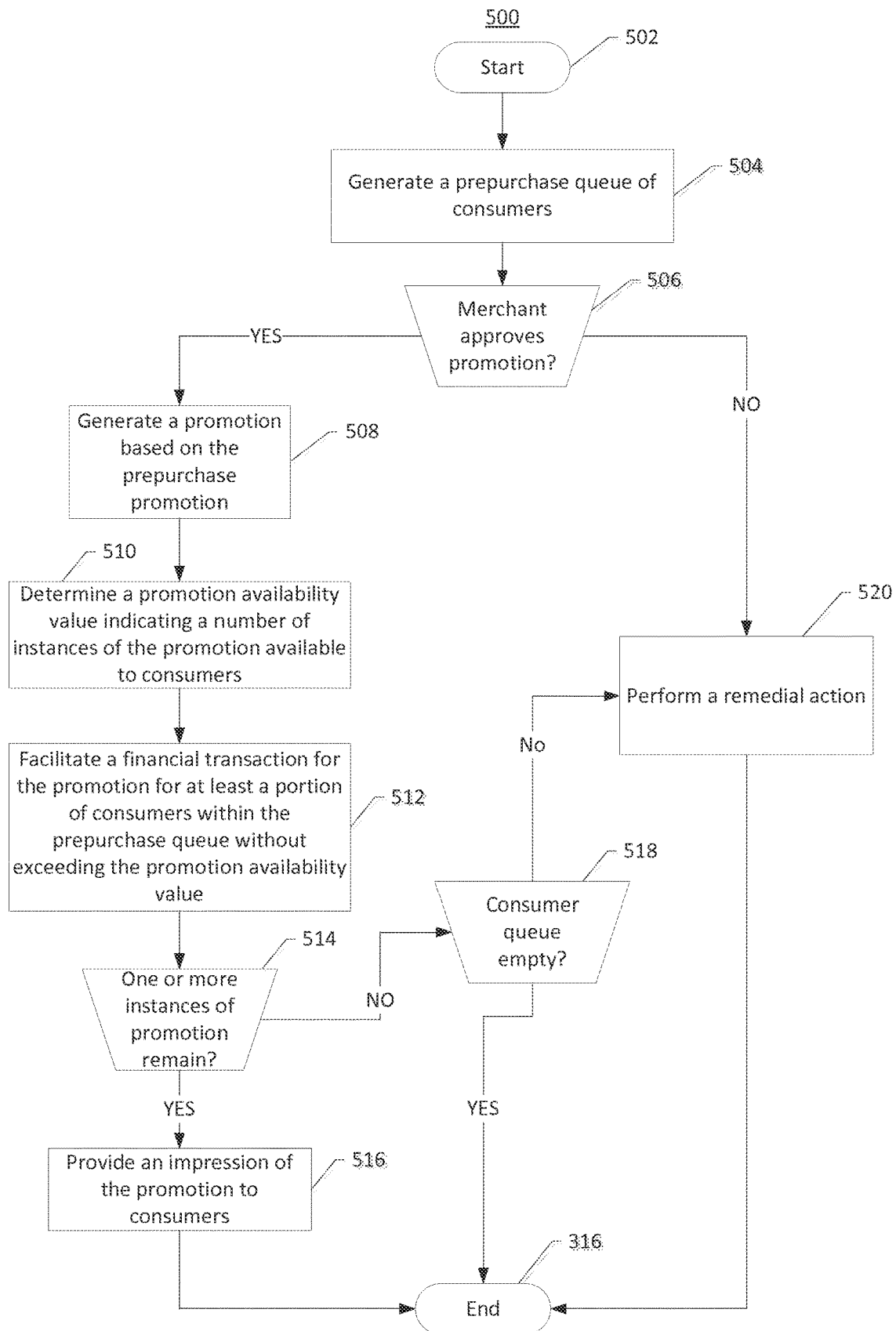
Figure 6:
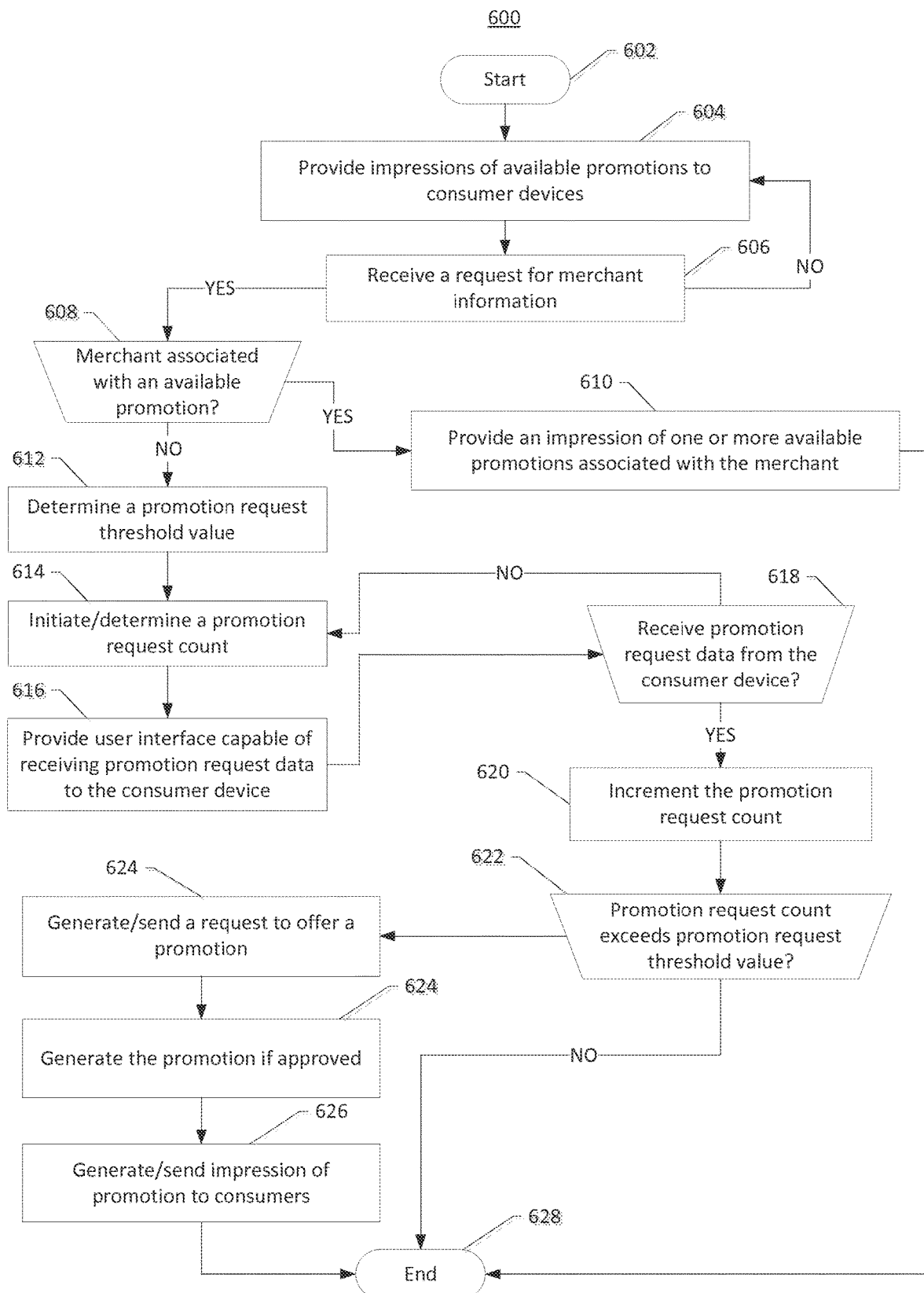
Figure 7:
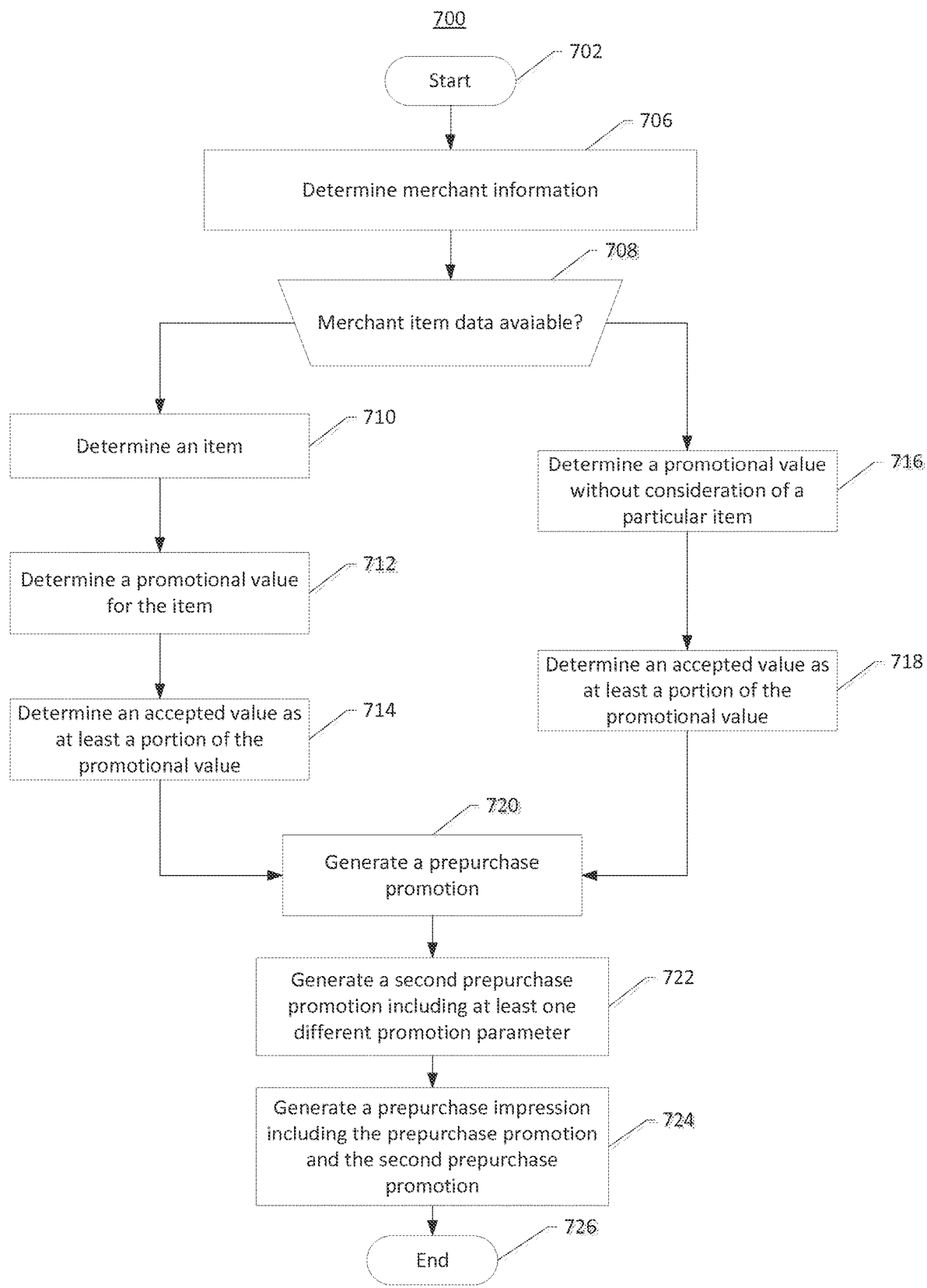

FIG. 3 shows an example of a method of providing a prepurchase promotion including a predefined accepted value in accordance with some embodiments;

FIG. 4 shows an example of a method of providing a prepurchase promotion based on a consumer-defined accepted value in accordance with some embodiments;

FIG. 5 shows an example of a method of providing a promotion based on a prepurchase queue in accordance with some embodiments;

FIG. 6 shows an example of a method of providing a requested promotion in accordance with some embodiments;

FIG. 7 shows an example of a method of determining promotion parameters of a prepurchase promotion; and FIG. 8 shows an example bid acceptance table 800 in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Where techniques are described herein with method flowcharts, it is appreciated that the steps of a method may not necessarily be performed in the order shown. Furthermore, in various embodiments, some or all of the steps of a method flowchart may not necessarily be performed.

Overview

Some embodiments may provide for a system capable of providing promotions of merchants to consumers. A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences (or "item(s)" as used herein) defined by the promotion. For example, a promotion may specify that for a $25 accepted value paid by the consumer, the consumer may receive $50 toward a purchase of running shoes at a particular merchant.

A promotion may be defined by and/or be associated with one or more "promotion parameters." Example promotion parameters may include an accepted value (e.g., a cost to purchase the promotion), a promotional value (e.g., the value of the resultant instrument beyond the accepted value), and/or the associated item or items of the promotion. In some embodiments, a promotion may further be associated with a promotion availability value indicating a number of instances of the promotion that is available to consumers (e.g., in total, within a predetermined period of time such as daily, weekly, monthly, yearly, etc.).

A "merchant" or "provider" may include, but is not limited to, a merchant, provider of a promotion, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce.

In some embodiments, the system may be configured to provide one or more "impressions" of a promotion to consumers. An "impression," as used herein, may include a communication, a display, or other perceived indication, such as a flyer, print media, e-mail, text message, application alert, mobile applications, other type of electronic interface or distribution channel and/or the like, of one or more promotions. For example, and using the aforementioned running shoe promotion, an impression may include an e-mail communication sent to consumer devices of consumers that indicates the availability of the $25 for $50 toward running shoes promotion.

An advantage that may be realized by some embodiments discussed herein is that merchants can attract business, build consumer loyalty, and improve brand recognition (among other things) through a "prepurchase promotion." A prepurchase promotion, as used herein, refers to preliminary promotional mechanism that may be requested and/or accepted for subsequent purchase by a consumer, and that is not a valid (e.g., redeemable) promotion until subsequent to merchant approval of one or more promotion parameters associated with the prepurchase promotion.

For example, the system may be configured to generate a prepurchase promotion of a merchant that includes a promotional value and an accepted value. The system may be further configured to generate a prepurchase impression of the prepurchase promotion and provide the prepurchase impression to consumers. A "prepurchase impression," as used herein, may include a communication, a display, or other perceived indication, such as a flyer, print media, e-mail, text message, application alert, mobile applications, other type of electronic interface or distribution channel and/or the like, of one or more prepurchase promotions. For example, prepurchase impression may include a communication sent to consumer devices of consumers that indicates a $25 for $50 toward running shoes prepurchase promotion of a merchant, which can prepurchased and/or accepted by the consumer prior to acceptance of the promotion parameters by the merchant, such as by providing payment data and/or some other indication of consumer intent.

Some embodiments may allow consumers to provide payment data and/or otherwise accept a prepurchase promotion or its promotion parameters (e.g., prior to creation and/or merchant approval of a promotion). The consumers may be placed in a consumer queue and may be automatically provided with a promotion based on the prepurchase promotion in the event that such a promotion is created and/or approved by the merchant. For example, upon a sufficient number of consumers expressing interest via prepurchase, the system may be configured to request and/or otherwise determine merchant approval of the prepurchase promotion or the promotion parameters. Subsequent to merchant approval, the system may then generate a promotion based on the prepurchase promotion, such as a promotion including the promotion parameters of the prepurchase parameters. Consumers within the consumer queue may be programmatically provided the promotion and impressions of the promotion may be provided to other consumers if remaining instances of the promotion remain.

Some embodiments may allow consumers to bid on the purchase price (or "accepted value") of a prepurchase promotion. For example, consumers may provide payment data and/or otherwise accept a prepurchase promotion including one or more promotion parameters at the consumer-defined accepted value. The consumers may be placed in a consumer queue and may be automatically provided with a promotion based on the prepurchase promotion in the event that such a promotion having a minimum accepted value that exceeds the consumer-defined accepted value created (e.g., subsequent to merchant acceptance). Some embodiments may further provide for techniques for determining one or more promotion parameters of a prepurchase promotion, including the promotional value, the accepted value, and/or the item(s) of the prepurchase promotion.

Some embodiments may further allow a consumer to request a promotion from a merchant that is not offering any promotions. For example, consumer requests may be tracked and upon meeting a predefined threshold, the system may be configured to generate and/or send a request to a merchant to provide one or more promotions on the behalf of the merchant.

Exemplary System Architecture

FIG. 1 shows an example system 100 in accordance with some embodiments. System 100 may include promotion and marketing system 102 (or "system 102"), network 104, consumer device 106, merchant device 108, personal area network (PAN) 110, and third party system 110. System 102 may be communicably connected with consumer device 106 and merchant device 108 via network 104. System 102 may include server 112 and database 114.

Server 112 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 112 may include several servers performing interconnected and/or distributed functions. To avoid unnecessarily overcomplicating the disclosure, server 112 is shown and described herein as a single server.

Database 114 may be any suitable network storage device configured to store some or all of the information described herein. For example, database 114 may be configured to store consumer information, merchant information, promotion information, and/or among other things. As such, database 114 may include, for example, one or more database systems, backend data servers, network databases, cloud storage devices, etc. To avoid unnecessarily overcomplicating the disclosure, database 114 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant, and may be located at a merchant shop and/or other location. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device.

In some embodiments, system 102 may be configured to receive promotion data from merchant device 108 indicating a promotion for goods, experiences and/or services (or "items" as used herein) and/or one or more promotion parameters of the promotion (e.g., target audience, timing, accepted value, promotional value, residual value, etc.). System 102 may then generate and/or provide one or more impressions for the promotion to consumer device 102, which may be redeemed with the merchant via merchant device 108, such as in connection with a financial transaction of a transaction session.

In some embodiments, system 100 may further include one or more third party systems 110, among other things. For example, third party system 110 may include a payment server configured to provide for the exchange of money, credits, etc. between the merchant and consumer. In some embodiments, various third party systems 110 may be associated with different types of payment sources. Thus for each payment source, data may be sent to an appropriate third party system (e.g., a credit card transaction server, etc.) to validate and/or process payments.

FIG. 2 shows a schematic block diagram of example circuitry 200, some or all of which may be included in system 102, server 112, database 114, consumer device 106, and/or merchant device 108. In accordance with some example embodiments, circuitry 200 may include various means, such as one or more processors 202, memories 204, communications modules 206, and/or input/output modules 208.

In some embodiments, such as when circuitry 200 is included in server 112, prepurchase promotion module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments discussed herein while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, prepurchase promotion module 210 may also or instead be included and configured to perform the functionality discussed herein related providing prepurchase promotions. In some embodiments, some or all of the functionality of prepurchase promotion module 210 may be performed by processor 202. In this regard, some or all of the example processes and algorithms discussed herein can be performed by at least one processor 202 and/or prepurchase promotion module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Prepurchase Promotions

FIG. 3 shows an example method 300 of providing a prepurchase promotion in accordance with some embodiments. Method 300 may be performed to allow consumers to accept and/or otherwise agree to purchase a prepurchase promotion including one or more predefined promotion parameters (e.g., including an accepted value). Subsequent to merchant approval of the one or more promotion parameters, a (e.g., non-prepurchase) promotion may be generated including the one or more promotion parameters. Consumers that have accepted the prepurchase promotion may be automatically charged the accepted value and be allowed to redeem the promotion, such as without requiring an additional indication of consumer approval of the promotion and/or submission of payment data.

Method 300, as well as the other methods herein, is discussed as being performed by a consumer device (e.g., consumer device 106), a merchant device (e.g., merchant device 108), and a server (e.g., server 112 of system 102 including database 114). However, in some embodiments, other suitable structures that can be suitably configured to perform method 300 can be used including circuitry, devices, apparatuses, networks, and/or among other things.

Method 300 may begin at 302 and proceed to 304, where a server (e.g., server 112 and/or other networked device) may be configured to provide a prepurchase impression of a prepurchase promotion to a consumer device. For example, server 112 may be configured to provide the prepurchase impression including one or more prepurchase promotions associated with a merchant to consumer device 106 via network 104.

The prepurchase impression may be provided via any suitable communication channel, such as email, text message, consumer device application, webpage, among other things. In some embodiments, the prepurchase impression may be provided at in response to a consumer action, such as accessing a webpage associated with the merchant via the consumer device, sending a request from the consumer device for a promotion and/or prepurchase promotion, and/or programmatically (e.g., at scheduled times, based on relevance matching, etc.).

In some embodiments, the server and/or one or more other servers of system 102 may be configured to provide a merchant webpage to consumers. The merchant webpage may be the official webpage of the merchant or may be a second webpage provided by the system on behalf of the merchant. Furthermore, the system may be configured to provide a merchant webpage for multiple merchants, such as regardless of whether a merchant has approved any promotions and/or promotion parameters. For example, the server may be configured to (e.g., programmatically) identify a merchant and create a merchant webpage based on available information (e.g., received from a merchant device, retrieved from database 114, accessed from the Internet, official merchant webpages, third party webpages (e.g., merchant review webpages, indexes, directories, etc.), and/or any other source). The merchant webpage may include information about the merchant such as the items offered, prices, ratings, reviews, among other things. Where the merchant has approved a promotion (e.g., based on a prepurchase promotion and/or otherwise), an impression including the promotion may be provided to the merchant webpage. Where the merchant has failed to or has otherwise not approved of a promotion, a prepurchase impression including one or more prepurchase promotions may be provided to the merchant webpage. Additionally or alternatively, the consumer may be allowed to request a promotion as discussed in method 600 and FIG. 6 below.

As discussed above, server 112 may be configured to provide promotions of merchants to consumer devices, such as via impressions. In some embodiments, the server may be configured to provide prepurchase promotions for merchants that are not otherwise associated with an available promotion provided by the system. For example, in response to a request for merchant information, without consumer action, and/or otherwise subsequent to determining to provide merchant information to a consumer device, the server may be configured to determine whether a merchant is associated with an available promotion. In response to determining that the merchant is associated with an available promotion, the server may be configured to send an impression including one or more promotions of the merchant to the consumer device. In response to determining that the merchant fails to be associated with an available promotion, the server may be configured to generate a prepurchase promotion associated with the merchant, generate a prepurchase impression of the prepurchase promotion, and/or send the prepurchase impression to the consumer device.

In some embodiments, a prepurchase promotion may be associated with and/or be defined by one or more promotion parameters. For example, a prepurchase promotion may be associated with promotion parameters including an accepted value, a promotional value, and one or more items (e.g., a product, service, and/or experience offered by the merchant). The accepted value may define the cost of purchasing the prepurchase promotion (or the promotion that is subsequently provided based on the prepurchase promotion). The promotional value, which may also be referred to as a redemption value, may define the value of one or more items receivable upon redemption of a promotion based on the prepurchase promotion.

In some embodiments, the prepurchase impression may include an indication of the one or more promotion parameters of the prepurchase promotion. Furthermore, in some embodiment, the server may be configured to provide a plurality of prepurchase promotions including predefined promotion parameters that are different. For example, a first prepurchase promotion may include promotion parameters having an accepted value that is 25% less than the promotional value (e.g., 25% off), and a second prepurchase promotion may include promotion parameters having an accepted value that is 50% less than the promotional value. In another example, such as for high quality merchants (e.g., based on factors such as ratings, price ranges, items offered, etc.), a first prepurchase promotion may include promotion parameters having an accepted value that is 10% less than the promotional value and a second prepurchase promotion may include promotion parameters having an accepted value that is 25% less than the promotional value. The items associated with a prepurchase promotion may also be predefined specifically (e.g., 25% for a particular running shoe), or may be defined more generally (e.g., any running shoe or any item offered by the merchant, etc.). Additional details regarding determining promotion parameters of a prepurchase promotion are discussed below in connection with method 700 and FIG. 7.

At 306, the server may be configured to determine a prepurchase threshold value. A prepurchase threshold value, as used herein, defines a number of consumer acceptances, indications of interest, and/or submissions of payment data for a prepurchase promotion that is needed before additional steps are taken to create a (e.g., redeemable) promotion based on the prepurchase promotion. For example, a prepurchase threshold value of 1,000 indicates that at least 1,000 consumers must express an intent to purchase a promotion based on the prepurchase promotion before the promotion including the one or more promotion parameters of the prepurchase promotion is created or otherwise made available to consumers.

In some embodiments, a prepurchase threshold value may not be used. For example, a promotion may be generated in response to receiving an indication of consumer interest regardless of a prepurchase threshold count, as discussed in greater detail below. Alternatively or additionally, other criteria for triggering the creation of a promotion based on a prepurchase promotion may be used other than prepurchase threshold count such as an expected revenue threshold value, as also discussed in greater detail below.

At 308, the server may be configured to initiate a prepurchase count. The prepurchase count may indicate the number of consumers that have accepted, expressed interest, and/or provided payment data for the prepurchase promotion. In that sense, the prepurchase count may be initiated at 0 and incremented or decremented based on data received from consumer devices indicating the appropriate consumer intent.

At 310, the server may be configured to determine whether prepurchase approval data is received from a consumer device indicating consumer acceptance of the one or more parameters of the prepurchase promotion and/or consumer acceptance of the prepurchase promotion. For example, the prepurchase approval data may be generated by a consumer device via a user interface provided as part of the prepurchase impression. The prepurchase impression may further indicate the terms of the consumer acceptance, such as a message indicating that submission of the prepurchase approval data means that the consumer has agreed to the one or more promotion parameters but does not necessarily mean that the consumer has already purchased a redeemable promotion.

In some embodiments, the server configured to provide the prepurchase impression includes the server being configured to provide an indication of one or more of the prepurchase threshold value and the prepurchase count to the consumer device. Here, the consumer may be provided with an indicator of how likely the prepurchase promotion will mature into a redeemable promotion and may be further motivated to share the prepurchase promotion with contacts such that the prepurchase count will exceed the prepurchase threshold value. In some embodiments, the server may be further configured to provide status updates to merchants, such as on a weekly, monthly, bi-monthly, etc. basis. For example, the status update may be provided to a merchant device and may include an indication one or more of the prepurchase threshold value and the prepurchase count.

In response to determining that the prepurchase approval data has not been received from the consumer device, method 300 may return to 308, where the server may be configured to continue to determine monitor receipts of prepurchase approval data and determine the prepurchase count accordingly.

In response to determining that the prepurchase approval data has been received from the consumer device, method 300 may proceed to 312, where the server may be configured to increment the prepurchase count. For example, each consumer may be associated with a consumer account and data may be generated and/or stored indicating that a consumer account has provided the prepurchase approval data. In some embodiments, a single consumer account may be allowed to provide a plurality of instances of prepurchase approval data each of which may increment the prepurchase count. In another example, a single consumer account may be allowed to increment the prepurchase count only a single time regardless of the number of instances of consumer approval data received from a consumer device associated with the consumer account.

At 314, the server may be configured to determine payment data. The payment data may include credit card data (e.g., card number, expiration date, card verification value, etc.), debit card data, financial account data, electronic payment account data, and/or any other data capable of being used by the server to facilitate a financial transaction.

In some embodiments, the prepurchase approval data received at 310 may include the payment data. The server may be further configured to store the payment data without facilitating the financial transaction until subsequent to generating the promotion. Additionally or alternatively, payment data may be stored by the system (e.g., by system 102 within database 114) in association with the consumer account. Here, the consumer may not be required to submit additional instances of payment data. For example, the consumer may elect via the consumer device to use stored payment data for subsequent transactions with system 102. Alternatively or additionally, the consumer may add additional payment sources (e.g., having different payment data) and/or may select a particular payment source from a plurality of stored payment sources.

At 316, the server may be configured to determine whether the prepurchase count exceeds (and/or meets) the prepurchase threshold value. As discussed above, the server may monitor the prepurchase count and compare the prepurchase count with the prepurchase threshold value.

In some embodiments, the server may be configured to determine whether the prepurchase count exceeds to the prepurchase threshold value at a prepurchase threshold time. A "prepurchase threshold time," when used, refers to a predetermined time at which the prepurchase threshold value must be exceeded (and/or matched) in order for the promotion based on the prepurchased promotion to be created. The prepurchased threshold time may ensure that consumers that provide prepurchase approval data will know whether the promotion will be created within the predetermined time rather than be left with uncertainty for an indefinite period of time. The server may be configured to determine a prepurchase threshold time, which may be defined as a predetermined time (e.g., 7-14 business days) after the prepurchase impression is provided to consumers and/or after one or more consumers provide the prepurchase approval data. The server may be further configured to compare the prepurchase threshold value with the prepurchase count at the prepurchase threshold time and/or determine whether the promotion based on the prepurchase promotion has been generated at the prepurchase threshold time.

In response to determining that the prepurchase count fails to exceed the prepurchase threshold value, method 300 may proceed to 318, where the server may be configured to determine whether prepurchase cancellation data has been received from the consumer device. The prepurchase cancellation data may indicate cancellation of the acceptance of the one or more parameters of the prepurchase promotion. For example, consumers may be allowed to cancel the agreement to accept the prepurchase promotion by providing the prepurchase cancellation data. In response to determining that the prepurchase cancellation data has been received, the server may be further configured to forego facilitating a financial transaction for the promotion based on the payment data. In some embodiments, the prepurchase cancellation data may be effective prior to the creation of the promotion, prior to lapse of the prepurchase threshold time, and/or prior to determining that the prepurchase count exceeds the prepurchase threshold value. In some embodiments, as discussed in further detail below, the consumer may be additionally or alternatively be allowed to provide prepurchase cancellation data subsequent to the creation of the promotion within a prepurchase cancellation time.

In response to determining that the prepurchase cancellation data has been received, method 300 may proceed to 320, where the server may be configured to decrement the prepurchase count. For example, where the prepurchase count as not yet exceeded the prepurchase threshold value, consumers may be allowed to provide prepurchase acceptance data and/or prepurchase cancellation data, each of which may cause the prepurchase count to be respectively incremented and/or decremented accordingly. In some embodiments, the server may be configured to, in response determining that the prepurchase cancellation data has been received and prior to determining that the prepurchase count exceeds the prepurchase threshold value, decrement the prepurchase count. In response to determining that the prepurchase cancellation data has failed to be received, method 300 may return to 316, where the server may be configured to continue to determine whether the prepurchase count exceeds the prepurchase threshold value.

In response to determining that the prepurchase count exceeds the prepurchase threshold value at 316, method 300 may proceed to 322, where the server may be configured to generate a request to offer a promotion including the one or more promotion parameters for transmission to a merchant. The promotion including the one or more promotion parameters of the prepurchase promotion may be the promotion "based on the prepurchase promotion," as used herein.

In some embodiments, the server may be further configured to, in response to determining that the prepurchase count exceeds the prepurchase threshold value, provide an alert to a display device of the server (and/or apparatus) or a second apparatus. For example, the alert may be provided to an operator of server 114 or system 102 such that the operator can contact the merchant for approval of the creation of the promotion based on the prepurchase promotion and/or for approval of the one or more promotion parameters.

In some embodiments, the server may be further configured to determine a merchant revenue share value for presentation to the merchant. The merchant revenue share value may indicate a total amount that can be paid to the merchant in exchange for accepting the creation of the promotion and/or the one or more promotion parameters. For example, the merchant revenue share value may be determined based on the prepurchase count and the accepted value. For example, server 110 may be configured to determine a (e.g., total) expected revenue value based on multiplying the accepted value with the prepurchase count. The merchant revenue share value may then be determined based on the expected revenue value, such as by taking a predetermined percentage of the expected revenue value.

In some embodiments, the server may be further configured to generate a message to the merchant including the merchant revenue share value such as: "You have 1,000 customers waiting to buy your promotion, accept it now and we will send you a check for $5,000 (e.g., the merchant revenue share value) and we will release vouchers to consumers over the next N months as you choose the monthly cap." The server may be further configured to provide the message to a merchant device associated with the merchant, such as via network 104.

At 324, the server may be configured to determine whether the merchant approves the promotion. For example, the server may be configured to receive promotion approval data from the merchant device indicating merchant approval of the promotion and/or the one or more promotion parameters. Alternatively or additionally, such as when the merchant is contacted by an operator, the operator may provide the promotion approval data, such as via a user input device associated with the server and/or a different networked apparatus of the operator.

In response to determining that the merchant approves the promotion, method 300 may proceed to 326, where the server may be configured to generate the promotion including the one or more promotion parameters. As discussed above, the one or more promotional parameters may include one or more of an accepted value, a promotional value, and applicable item(s).

At 328, the server may be configured to facilitate a financial transaction for the promotion based on the payment data. For example, one or more consumers that provided payment data and/or prepurchase approval data may be programmatically charged for the promotion. The server may be further configured to provide an instrument for redemption of the promotion to the consumer device subsequent to facilitating the financial transaction.

As discussed in further detail below in connection with method 500 and FIG. 5, in some embodiments, the merchants may be allowed to specify a promotion availability value indicating a number of instances of the promotion available to consumers. In that sense, merchants may be allowed to budget or plan promotion availability (e.g., on a daily, weekly, monthly, yearly basis, etc.) as suitable or desired. Consumers may be placed in a prepurchase queue and financial transactions may be performed for at least a portion of consumers within the prepurchase queue without exceeding the promotion availability value, where each financial transaction depletes an instance of the promotion available to consumers.

In some embodiments, consumers may be allowed to cancel a prepurchase promotion after the promotion has been generated. For example, subsequent to generating the promotion including the one or more promotion parameters, the server may be configured to determine a prepurchase cancellation time indicating a predetermined time within which the consumer may cancel the purchase of the promotion by providing prepurchase cancellation data. In some embodiments, the server may be configured to provide an indication of the prepurchase cancellation time to the consumer device. The server may be further configured to determine whether prepurchase cancellation data indicating cancellation of the acceptance of the promotion and/or the one or more parameters has been received from the consumer device prior to the prepurchase cancellation time (e.g., 48 hours after the indication of the prepurchase cancellation time is sent to the consumer device). In response to determining that the prepurchase cancellation data has failed to be received by the prepurchase cancellation time, the server may facilitate the financial transaction. Alternatively, in response to determining that the prepurchase cancellation data has been received by the prepurchase cancellation time, the server may forego facilitating the financial transaction based on the payment data.

Returning to 324, in response to determining the merchant has failed to approve the promotion (and/or in response to determining that the promotion has failed to be generated at the prepurchase threshold time), method 300 may proceed to 330, where the server may be configured to perform one or more remedial actions. For example, the server may be configured to forego facilitating the financial transaction based on the payment data and/or provide an indication that the promotion was not generated to the consumer device.

In some embodiments, server 110 may be configured provide to the consumer device an impression of one or more promotions associated with one or more merchants different from the merchant associated with the prepurchase promotion. In some embodiments, the one or more promotions may be determined based on the promotion parameters of the prepurchase promotion accepted by the consumer, such as for similar items, accepted values, promotional values, etc. Where the merchant has previously approved of a promotion, the server may be additionally or alternatively configured to provide the approved promotion to the consumer device. In some embodiments, the server may be further configured to associate the merchant with the consumer account of the consumer such as for providing subsequent communication to the consumer device of promotions, prepurchase promotions, merchant information, merchant updates, merchant events, staffing changes (e.g., for service merchants), etc. associated with the merchant.

In some embodiments, the merchant may be allowed to modify one or more promotion parameters. For example, the promotion approval data received at 324 may include an indication of merchant approval that is contingent upon a different accepted value, promotional value, and/or item(s). Here, server 110 may be configured to provide a notification to the consumer device of the modified one or more promotion parameters. In some embodiments, the consumer may be allowed to accept (e.g., via a 1-click interaction) the one or more modified promotion parameters or cancel the acceptance. Method 300 may then proceed to 332 and end.

FIG. 4 shows an example method 400 of providing a prepurchase promotion based on a consumer-defined accepted value in accordance with some embodiments. Method 400 may be performed to allow consumers to bid on the accepted value of a prepurchase promotion including one or more predefined promotion parameters (e.g., including a predefined promotional value and/or one or more items). Subsequent to merchant approval of the consumer-defined accepted value, a (e.g., non-prepurchase) promotion may be generated including the one or more promotion parameters at the consumer-defined accepted value. Consumers that have accepted the prepurchase promotion may be automatically charged the consumer-defined accepted value and be allowed to redeem the promotion, such as without requiring an additional indication of consumer approval of the promotion and/or submission of payment data.

Method 400 may begin at 402 and proceed to 404, where the server may be configured to provide a prepurchase impression of a prepurchase promotion to a consumer device. The discussion at 304 of method 300 may be applicable at 404. In some embodiments, the prepurchase promotion may be associated with one or more promotion parameters including a predefined promotional value and/or predefined item(s). Here, however, the accepted value may not be predefined such that consumers may be allowed to provide a consumer-defined accepted value.

At 406, the server may be configured to determine an expected revenue threshold value. The expected revenue threshold value may indicate the minimum expected revenue value required prior to initiation of the creation of the promotion based on the prepurchase promotion and may be an example of financial criteria used to trigger creation of the promotion. Alternatively or additionally, the creation of the promotion may be based at least in part on consumer demand criteria, such as a prepurchase count threshold indicating a number of consumers that have provided a bid above one or more predetermined bid amount thresholds and/or predefined accepted values (e.g., as discussed above in connection with method 300).

At 408, the server may be configured receive bid data from the consumer device indicating a consumer-defined accepted value and consumer acceptance of the one or more promotion parameters at the consumer-defined accepted value. For example, the bid data may be provided via a user interface including the prepurchase impression provided to the consumer device at 404. For example, the user interface may include the prepurchase impression including the promotional value and a user input portion configured to receive the bid data. In some embodiments, the consumer-defined accepted value may be entered by the consumer as a percentage saving from the promotional value (e.g., 25% off) and/or as a flat value. In some embodiments, the consumer-defined accepted value may be allowed to exceed the promotional value, such as to allow consumers to overbid for priority of a limited supply item and/or a high demand reservation time, etc.

In some embodiments, the server may be further configured to determine payment data associated with the consumer and/or consumer account. The payment data may be received from the consumer device in connection with the bid data and may indicate consumer approval to purchase a promotion based on the prepurchase promotion at the consumer-defined accepted value using the payment data. The discussion at 314 of method 300 may be applicable at 408.

At 410, the server may be configured to determine a bid acceptance likelihood value based on the consumer-defined accepted value. For example, the server may be configured to track historical bid data approval data indicating consumer-defined accepted values and bid acceptance rates for the merchant and/or for one or more other merchants (e.g., aggregated data cross merchants). The server may be further configured determine a relationship between consumer-defined accepted values and bid acceptance likelihood values based on historical bid approval data. Based on the consumer-defined accepted value received at 408, the server may configured to determine a bid acceptance likelihood value associated with the consumer-defined accepted value based at least in part on the relationship between consumer-defined accepted values and bid acceptance likelihood values.

In some embodiments, subsequent to receiving the bid data from the consumer device indicating the consumer-defined accepted value, the server may be configured to provide an indication of the bid acceptance likelihood value associated with the consumer-defined accepted value to the consumer device. The consumer may then be allowed to provide an updated consumer-defined accepted value in view of the acceptance likelihood value.

In some embodiments, the server may be configured to provide a recommended consumer-defined accepted value. The recommended consumer-defined accepted value may be used to guide the consumer towards a constructive bid that is likely to be acceptable to the merchant and may be provided prior to (e.g., within the prepurchase impression) and/or subsequent to receiving the bid data. For example, the server may be configured to determine the recommended consumer-defined accepted value based at least in part on the relationship between consumer-defined accepted values and bid acceptance likelihood values. The recommended bid acceptance value may be selected, for example, such that the consumer-defined accepted value exceeds a predefined threshold bid acceptance likelihood value (e.g., 50%, 70%, 90%, etc.).

FIG. 8 shows an example bid acceptance table 800 in accordance with some embodiments. Bid acceptance table indicates the relationship between consumer-defined accepted values (expressed as a percent discount from the promotional value), merchant quality values (e.g., indicating merchant type (e.g., luxury item or commodity), star rating (e.g., from 2 star to 5 star), etc.), and bid acceptance likelihood values (expressed as a percent). In some embodiments, bid acceptance table 800 and/or the data shown therein may be generated based on the historical bid data approval data indicating consumer-defined accepted values and bid acceptance rates and/or stored in a database for subsequent use (e.g., database 114).

At 412, the server may be configured to determine an expected revenue value based on the consumer defined-acceptance value and the bid acceptance likelihood value. In some embodiments, the server may be configured to track and/or determine historical data associated with the prepurchase promotion indicating consumer-defined accepted values, bid counts associated with the consumer-defined accepted values, and bid acceptance likelihood values associated with the consumer-defined accepted values for a plurality (e.g., some or all) consumer bids. The server may be further configured to determine the expected revenue value based on at least a portion of the historical data. For example, for a given consumer-defined accepted value, the expected revenue value may be determined based on a multiplication the consumer-defined accepted value with the associated bid acceptance likelihood value and the associated bid acceptance likelihood value. In some embodiments, one or more (e.g., all) expected revenue values associated with each consumer-defined accepted value may be further conglomerated into a total expected revenue value for the prepurchase promotion.

At 414, the server may be configured to determine whether the expected revenue value exceeds the expected revenue threshold value. The expected revenue value and expected revenue threshold value may be used and/or compared as a trigger for sending a request for merchant approval of a promotion based on the prepurchase promotion. As such, the expected revenue threshold value may be set to an amount that makes contacting the merchant financially beneficial without being excessively bothersome.

In some embodiments, the merchant may be contacted for each consumer-defined bid and/or may be contacted to determine a minimum accepted value in alternative or in addition to using expected revenue values as a triggering step for contacting the merchant and/or generating the promotion based on the prepurchase promotion. In some embodiments, to avoid contacting the merchant with excessively low consumer-defined accepted values (e.g., regardless of how many consumers may provide such a low bid), the server may be configured to determine an internal minimum accepted value. For example, the internal minimum accepted value may be defined based on a threshold bid acceptance likelihood value (e.g., 50%). In another example, the internal minimum accepted value may include and/or be based on the recommended consumer-defined accepted value. The server may be configured to request determine whether a consumer-defined accepted value is below the internal minimum accepted value, and in response to determining that the consumer-defined accepted value is below the internal minimum accepted value, provide a request to the consumer device to provide a larger consumer-defined accepted value. The consumer may be further notified that the consumer-defined accepted value is too low and that the current bid will be ineffective.

In some embodiments, the server may be configured to determine a prepurchase threshold time indicating a predetermined time at which the expected revenue value must exceed (and/or match) the expected revenue threshold value in order for the promotion based on the prepurchase promotion to be created. The discussion at 316 of method 300 may be applicable at 414. For example, the server may be configured to determine whether the expected revenue value must exceed the expected revenue threshold value at the prepurchase threshold time.

In response to determining that the expected revenue value fails to exceed the expected revenue threshold value (e.g., prior to lapse of the prepurchase threshold time when such a threshold time is used), method 400 may return to 408, where the server may continue to receive bid data from consumer devices.

In response to determining that the expected revenue value exceeds the expected revenue threshold value, method 400 may proceed to 416, where the server may be configured to generate a request to offer a promotion including the one or more promotion parameters at the consumer-defined accepted value for transmission to a merchant. The server may be further configured to provide a request to a merchant device associated with the merchant. In some embodiments, in response to determining that the expected revenue value exceeds the expected revenue threshold value, the server may be alternatively or additionally configured to provide an alert to a display device of the server or a second apparatus (e.g., of an operator of system 102).

In some embodiments, the server may be configured to determine a merchant revenue share value based on (e.g., as predetermined percentage or other portion of) the expected revenue value. As discussed above, the merchant revenue share value may indicate a total amount that can be paid to the merchant in exchange for accepting the creation of the promotion and/or the one or more promotion parameters. For example, in response to determining that the expected revenue value exceeds the revenue threshold value, the server may be configured to determine the merchant revenue share value based on the expected revenue value and provide an indication of the merchant revenue share value to the merchant device. In some embodiments, the server may be configured to provide a plurality of consumer-defined accepted values each associated with a different merchant revenue share value. The merchant revenue share values may further be determined to incentivize the merchant to provide a larger percentage discount, such as by providing a larger merchant revenue share value for a larger discount. The server may be further configured to generate a message to the merchant including one or more merchant revenue share values such as: "If you are willing to offer 10% off, we have 102 consumers who have already bought the promotion and we'll send you a check for $500 (first merchant revenue share value). If you are willing to offer 20% off, we have 160 consumers who've already bought the deal and we'll send you a check for $1,600."

At 418, the server may be configured to determine whether the merchant approves the promotion, the consumer-defined acceptance value, and/or the one or more promotion parameters. Some or all of the discussion at 324 of method 300 may be applicable at 418. For example, the server may be configured to receive bid approval data from a merchant device indicating acceptance of the one or more promotion parameters at the consumer-defined acceptance value.

In response to determining that the merchant approved the promotion, the consumer-defined acceptance value, and/or the one or more promotion parameters, method 400 may proceed to 420, where the server may be configured to determine a minimum accepted value approved by the merchant. The minimum accepted value may be different or the same as a consumer-defined acceptance value provided to the merchant with the request to offer the promotion. For example, the server may be configured to provide a bid approval request to the merchant device including the consumer-defined accepted value, or a plurality of consumer-defined accepted values. In response and/or subsequent to providing the bid approval request, the server may be configured to receive bid approval data indicating the minimum accepted value from the merchant device. In another example, the server may be configured to determine the minimum accepted value based on data entry provided via a user input device associated with the server or other networked device (e.g., used by an operator of system 102 subsequent to contacting the merchant).

At 422, the server may be configured to generate the promotion including the one or more promotion parameters. The promotion may be generated based on the prepurchase promotion and may include the consumer-defined accepted value and/or a minimum accepted value as a promotion parameter. The discussion at 326 of method 300 may be applicable at 422.

At 424, the server may be configured to determine whether the consumer-defined accepted value of a consumer exceeds (and/or matches) the minimum accepted value. For example, the bid data received at 408 from the consumer device may be compared with the minimum accepted value determined at 420. In some embodiments, bid data defining consumer-defined accepted values form a plurality of consumers may be compared with the minimum accepted value and each consumer may be identified as having successfully provided a bid that exceeds or fails to exceed the minimum accepted value.

In response to determining that the consumer-defined accepted value exceeds the minimum accepted value, method 400 may proceed to 426, where the server may be configured to facilitate a financial transaction for the promotion based on the consumer-defined accepted value. For example, the financial transaction may be completed based on the consumer-defined accepted value and using the payment data. The discussion at 328 of method 300 may be applicable at 426. In some embodiments, a plurality of consumer may be charged the minimum accepted value or a common consumer-defined accepted value. In some embodiments, each consumer that has provided bid data indicating consumer-defined accepted values that exceed the minimum accepted value may be charged based on their respective consumer-defined accepted values.

In response to determining that the merchant has not approved the promotion and/or the consumer-defined accepted value at 428 and/or in response to determining that the consumer-defined acceptance value of a consumer fails to exceed the minimum accepted value, method 400 may proceed to 424, where the server may be configured to perform a remedial action. The discussion at 330 of method 300 may be applicable at 428, such as for when the merchant has failed to approve the promotion.

In some embodiments, such as when the consumer-defined accepted value fails to exceed the minimum accepted value, the remedial action may additionally or alternatively include providing to the consumer device one or more of: a request for a second consumer-defined accepted value that is greater than the (e.g., first) consumer-defined accepted value and/or the minimum accepted value, a request for approval of a second prepurchase threshold time that is subsequent to the (e.g., first) prepurchase threshold time (e.g., allowing the merchant more time to accept the consumer-defined accepted value and/or allowing for larger consumer bids that raise the expected revenue value), and/or an option to cancel the consumer acceptance of the one or more promotion parameters at the consumer-defined accepted value. Furthermore, in some embodiments, the consumer may be allowed to provide prepurchase cancellation data indicating cancellation of the bid data and/or consumer-defined accepted value as discussed above in connection with method 300. Method 400 may then proceed to 430 and end.

FIG. 5 shows an example of a method 500 of providing a promotion based on a prepurchase queue in accordance with some embodiments. For example, in connection with a merchant approving a promotion and/or one or more promotion parameters based on a prepurchase promotion as discussed above in connection with methods 300 and/or 400, the merchant may be allowed to specify a promotion availability value that limits the number of promotions that may be provided to consumers (e.g., in total and/or within a predetermined period of time). As such, consumers may be added to a consumer queue that indicates a priority of consumers in the event that more consumers have prepurchased than allowed by the promotion availability value.

Method 500 may begin at 502 and proceed to 504, where the server may be configured to generate a prepurchase queue of consumers. The consumer queue may indicate an ordered priority of consumers for facilitating a financial transaction for a promotion based on a prepurchase promotion. For example, consumers may be added to the prepurchase queue in response to receiving prepurchase approval data from a consumer device (e.g., at 310 of method 300) and/or in response to receiving bid data from a consumer device (e.g., at 408 of method 400). In some embodiments, methods 300 may be performed separately from method 400, and separate consumer queues may be used. Similarly, when the server receives prepurchase cancellation data from a consumer device, the server may be configured to remove the applicable consumer from the consumer queue.

In some embodiments, such as where consumers provide consumer-defined accepted values, the prepurchase queue may alternatively or additionally be ordered based on the consumer-defined accepted values. For example, a first consumer providing bid data indicating a higher consumer-defined acceptance value may be placed higher within the consumer queue than a second consumer providing bid data indicating a lower consumer-defined acceptance value.

At 506, the server may be configured to determine whether the merchant approves a promotion and/or one or more promotion parameters based on the prepurchase promotion. The discussion at 324 of method 300 and/or 418 of method 400 may be applicable at 506.

In response to determining that the merchant approves the promotion and/or the one or more promotion parameters, method 500 may proceed to 508, where the server may be configured to generate a promotion based on the prepurchase promotion. The discussion at 326 of method 300 and/or 422 of method 400 may be applicable at 508.

At 510, the server may be configured to determine a promotion availability value indicating a number of instances of the promotion available to consumers. The promotion availability value may be received from a merchant device, such as in connection with receiving bid approval data and/or promotion approval data from a merchant device/

The promotion availability value may define a one-off value where the promotion is no longer available once each of the instances of the promotion has been exhausted. Alternatively or additionally, the promotion availability value may define a number of instances of the promotion available to consumers within a predetermined period of time. For example, the promotion availability value may define an hourly, daily, weekly, monthly, yearly amount, etc. In another example, promotion availability values may vary based on time. Merchants may specify, for example, a greater promotion availability value during non-peak times of days, months of a year, etc. and/or a lower promotion availability value during peak times, weeks, months, etc. In yet another example, the merchant may specify an initial promotion availability value that is different from one or more subsequent promotion availability values, such as for a new merchant that is particularly interested in attracting business.

At 512, the server may be configured to facilitate a financial transaction for the promotion for at least a portion of consumers within the prepurchase queue without exceeding the promotion availability value. Each financial transaction may deplete an instance of the promotion available to consumers defined by the promotion availability value. For example, the consumers within the consumer queue may be processed in the order indicated and/or in a first-in first-out basis, decrementing the promotion availability value until it has been depleted and/or until a financial transaction for the promotion has been processed for each consumer within the consumer queue. The discussion at 328 of method 300 and/or 426 of method 400 may be applicable at 512.

At 514, the server may be configured to determine whether one or more instances of the promotion remain after facilitating the financial transaction for the at least a portion of consumers within the consumer queue. For example, the determination may be performed subsequent to facilitating financial transactions for the promotion for each consumer within the consumer queue without exceeding the promotion availability value.

In response to determining that one or more instances of the promotion remain, method 500 may proceed to 516, where the server may be configured to provide an impression of the promotion to consumers other than the at least a portion of consumers. For example, the impression may be provided to consumer devices associated with consumers that were not in the consumer queue, thereby allowing other consumers to purchase and/or otherwise the promotion.

In response to determining that one or more instances of the promotion remain, method 500 may proceed to 518, where the server may be configured to determine whether the consumer queue is empty. If the consumer queue fails to be empty, meaning that at least one consumer within the consumer queue did not receive the promotion, method 500 may proceed to 520, where the server may be configured to perform a remedial action for the at least one consumer. For example, the server may be configured to send a message to consumer device(s) associated with the at least one consumer indicating that the promotion is unavailable and that their payment data will not be used to facilitate a financial transaction for the promotion. In another example, such as where the promotion is available at a subsequent time (e.g., next week, next month, etc.), the server may be configured to additionally or alternatively send a message to the consumer device giving the consumer an option to accept the promotion when it becomes available.

Returning to 306, in response to determining that the merchant failed to approve the promotion, method 500 may proceed to 520. In that sense, the discussion above at 330 of method 300 and 428 of method 400 may be applicable at 520. Method 500 may then proceed to 522 and end.

FIG. 6 shows an example of a method 600 of providing a requested promotion in accordance with some embodiments. A "requested promotion," as used herein, refers to a promotion that is generated in response to one or more consumer requests. In some embodiments, a requested promotion may be prepurchased via submission of payment data and/or approval of payment data use. Alternatively or additionally, a requested promotion may not be a prepurchase promotion. For example, rather than facilitating a financial transaction for a promotion based on the requested promotion, consumers may be notified and/or otherwise provided with an opportunity to purchase the promotion after it has been created.

Method 600 may begin at 602 and proceed to 604, where a server (e.g., server 112 of system 102) may be configured to provide impressions of available promotions to consumer devices. The available promotions may include promotions that have been approved by one or merchants that are currently being offered to consumers. For example, server 112 may be configured to receive promotion data from merchant devices 108 via network 104 that defines the one or more promotion parameters of the promotions. The server may be further configured to generate promotions based on the promotion data, generate impressions of the promotions, and provide the impressions to consumer devices 106 via network 104.

At 606, the server may be configured to receive a request for merchant information associated with a merchant from a consumer device. For example, the server may be configured to provide a merchant webpage including the merchant information that may be accessed by consumers via consumer devices. Additionally or alternatively, the merchant information may be provided via an impression and/or a prepurchase impression.

At 608, the server may be configured to determine whether the merchant is associated with an available promotion provided by the server and/or system 102. For example, server 112 may be configured to query a promotion database (e.g., database 114) to retrieve promotion data indicating available promotions, a listing of available promotions, etc. The server may be further configured to determine whether the merchant is associated with an available promotion based on the retrieved promotion data.

In response to determining that the merchant is associated with an available promotion, method 600 may proceed to 610, where the server may be configured to provide an impression of one or more available promotions associated with the merchant to the consumer device. For example, the one or more available promotions may be selected based on relevance matching to the consumer, such as by comparing promotion parameters with consumer information associated with a consumer account. In another example, the one or more available promotions may be determined based on consumer input, such as browsing or searching webpage provided by the server and/or system 102.

In response to determining that the merchant fails to be associated with an available promotion, method 600 may proceed to 612, where the server may be configured to determine a promotion request threshold value. The promotion request threshold value may define a number of consumer requests that are needed before further steps towards creation of a promotion are taken.

At 614, the server may be configured to initiate a promotion request count. The promotion request count may indicate the number of consumers that have requested a promotion with a particular merchant. In that sense, the promotion request count may be initiated at 0 and incremented (or decremented) based on data (e.g., promotion request data) received from consumer devices indicating the appropriate consumer intent.

At 616, the server may be configured to provide a user interface capable of receiving promotion request data to the consumer device. For example, the user interface may be configured to allow the consumer to generate the promotion request data, such as by selecting a request promotion button (e.g., a 1-click interaction).

At 618, the server may be configured to determine whether promotion request data indicating that a consumer is interested in purchasing a promotion associated with the merchant has been received from the merchant device. In some embodiments, the promotion request data may indicate one or more consumer-defined promotion parameters and/or a selection of one or more predefined promotion parameters (and/or one or more bundles of promotion parameters).

In response to determining that the promotion request data has failed to be received from the consumer device, method 600 may return to 614, where the server may be configured to continue to determine the promotion request count, such as by monitoring receipt of promotion request data from consumer devices.

In response to determining that the promotion request data has been received from the consumer device, method 600 may proceed to 620, where the server may be configured to increment the promotion request count. For example, the promotion request count may be incremented for each instance of promotion request data received from a unique consumer and/or consumer account. In that sense, the possibility that a single consumer may submit multiple requests (e.g., without also agreeing to additional instances of prepurchase with payment data) may be mitigated. In some embodiments, the server may be further configured to place consumers that provide promotion request data within a consumer queue.

At 622, the server may be configured to determine whether the promotion request count exceeds (and/or matches) the promotion request threshold value. In some embodiments, the server may be configured to perform the determination at a promotion request threshold time, defining a predetermined time at which the promotion request count may be compared with the promotion request threshold value.

At 624, the server may be configured to generate a request to offer a promotion for transmission to the merchant. The request may, but does not necessarily, include one or more predefined and/or consumer-defined promotion parameters that may be provided to the merchant for approval. In some embodiments, the promotion request count, promotion request threshold value, and/or promotion request threshold time may not be used. For example, the server may be configured to generate the request in response to receiving the promotion request data form the consumer device at 618. In some embodiments, the server may be further configured to send the request to a merchant device. Alternatively or additionally, the server may be configured to, in response to determining that the prepurchase count exceeds the prepurchase threshold value, provide an alert to a display device of the server or a second apparatus.

In some embodiments, subsequent to and/or in response to the server sending the request to offer the promotion, the server may be configured to receive request response data from the merchant device. The request response data may indicate merchant approval to allow the server and/or system 102 to provide one or more promotions associated with the merchant. In some embodiments, the server may be further configured to receive promotion data from the merchant device indicating one or more promotion parameters of the promotions. In some embodiments, the server may be further configured to determine a promotion availability count, such as based on the request response data and/or promotion data received from the merchant device.

At 624, the server may be configured to generate the promotion. In some embodiments, the server may be configured to determine (e.g., based on request response data and/or promotion data) whether a promotions including one or more promotion parameters has been approved by the merchant. In response to determining that the promotion has been approved, the server may be configured to generate the promotion including the one or more promotion parameters.

At 626, the server may be configured to generate and/or send an impression of the promotion to consumers. For example, server 112 may be configured to send the impression to consumer devices 106 via network 104. In some embodiments, each consumer that has provided promotion request data may be placed in a consumer queue (e.g., based on timing of request) and/or a consumer listing (e.g., without an order). The server may be further configured to provide the impression to consumer devices associated with one or more consumers within the consumer queue and/or consumer list. In some embodiments, the server may be further configured to provide the impression to consumers other than those that have provided promotion request data. In some embodiments, such as when the promotion is associated with a promotion availability count and/or is other limited in supply, consumers within the consumer queue and/or consumer list may be provided the impression prior to the impression being provided to other consumers that have not provided promotion request data.

In some embodiments, the server may be further configured to associate the merchant with one or more consumers that provided the promotion request data. For example, the association may indicate that the consumer is interested in the merchant and/or a particular type of item. The server may be further configured to provide the consumer with subsequent promotions of the merchant and/or promotions of other (e.g., similar) merchants. Method 600 may then proceed to 628 and end.

FIG. 7 shows an example of a method 700 of determining promotion parameters of a prepurchase promotion. Method 700 may be performed, for example, prior to and/or in connection with methods 300 and 400 to generate a prepurchase promotion including the one or more parameters that define the prepurchase promotion.

Method 700 may begin at 702 and proceed to 704, where the server may be configured to determine merchant information. The merchant information may be received from a merchant device associated with the merchant. In another example, the merchant information may be entered by an operator of the server and/or system, such as via a user input device. The merchant information may additionally or alternatively be determined based on online merchant information provided by the merchant. In yet another example, the merchant information may be determined based on information provided by consumers and/or consumer device and/or third party systems (e.g., merchant quality ratings, reviews, etc.).

The merchant information may include any suitable information for determining one or more parameters of a prepurchase promotion and/or promotion associated with the merchant. For example, the merchant information may include location, merchant category (e.g., the industry or business of the merchant such as restaurant, spa, retail shop, etc.), promotion category (e.g., the type items provided by the merchant), menu items, item prices, services offered, etc. In some embodiments, the merchant information may further include a merchant quality. For example, merchant quality may be based on consumer reviews, reputation in the industry, brand name recognition, among other things.

At 708, the server may be configured to determine whether merchant item data is available. Merchant item data may indicate the products, experiences, and/or services offered by the merchant. In some embodiments, a prepurchase promotion may be associated with and/or be for a particular item when such information is available.

In response to determining that merchant item data is available, method 700 may proceed to 710, where the server may be configured to determine an item for a prepurchase promotion. For example, an item may include one or more menu items offered by a restaurant merchant. In another example, for a retail merchant, an item may include a particular product, brand, and/or category of product (e.g., all shoes). In another example, such as for a service merchant like a spa, the item may include a particular package offered by the merchant, such as a 30 minute message. Advantageously, determining a particular item for a prepurchase promotion may allow the merchant to promote a particular item, to discount a particular item for clearing inventory, and/or to allow the merchant to plan and/or forecast future demand.

At 712, the server may be configured to determine a promotion value for the item. In some embodiments, the promotional value may be based on price data indicating the price of one or more items determined at 710. The promotional value may include the full cost of the one or more items, may exceed the cost of the one or more items, or may be a portion of the cost of the one or more items.

At 714, the server may be configured to determine an accepted value as at least a portion of the promotional value. As discussed above, the accepted value may define the value that is provided by the consumer to receive the benefit of the promotional value. In that sense, an accepted value may be determined as a 10%, 25%, 50%, etc. discount from the promotional value.

In some embodiments, the accepted value and/or % discount from the promotional value may be based on merchant quality. For example, higher rated, quality and/or in demand merchants may be less willing or may benefit less from a higher discount. As such, the server may be configured to determine a lower discount (e.g., 10%-25%) for a higher quality merchant and a higher discount (e.g., 25%-50%) for a lower quality merchant. In some embodiments, historical merchant approval data, promotion data, etc. associated with a merchant (and/or a similar merchant with regards to merchant category, item category, quality, etc.) may be used as a basis for determining the accepted value and/or % discount. In some embodiments, such as for high demand merchants, the accepted value may exceed the promotional value. In some embodiments, the techniques discussed herein regarding determining a recommended consumer-defined accepted value at 410 of method 400 may also be used to determine the accepted value. For example, the server may be configured to determine historical data indicating accepted values and bid acceptance likelihood values associated with the accepted values, and determine the accepted value based on at least a portion of the historical data.

In some embodiments, the techniques discussed herein regarding determining the expected revenue value and/or the merchant revenue share value may also be used to determine the accepted value and/or % discount from the promotional value. For example, a low expected revenue value and/or the merchant revenue share value, being a function that is directly related with the accepted value, may be unattractive to merchants. As such, various accepted values processed with the expected revenue value and/or the merchant revenue share value algorithm discussed above (e.g., for a hypothetical and/or likely number of consumers that would accept a prepurchase promotion at each accepted value) to determine a likely expected revenue value and/or the merchant revenue share. Each of the expected revenue value and/or the merchant revenue share for each accepted value may then be compared with a predefined revenue threshold. Finally, the server may be configured to determine an accepted value that exceeds the predefined revenue threshold as the accepted value accepted value and/or % discount from the promotional value.

Returning to 708, in response to determining that merchant item data is unavailable, method 700 may proceed to 716, where the server may be configured to determine a promotional value without consideration of a particular item and/or item price. For example, the promotional value may be determined as a general coupon amount that may be used at the merchant for any item offered by the merchant. In some embodiments, the promotional value may be determined based on a general price range of the merchant. For example, a restaurant merchant may be associated with a lower promotional value than an automobile merchant because of the general disparity in item prices.

At 718, the server may be configured to determine an accepted value as at least a portion of the promotional value. The discussion at 714 may be applicable at 718.

At 720, the server may be configured to generate a prepurchase promotion based on the one or more determined promotion parameters. In some embodiments, generating the prepurchase promotion may include storing the prepurchase promotion and related data within a promotion database.

In some embodiments, the server may be further configured to determine a merchant revenue share value. For example, the merchant revenue share value may be determined first by deducting a flat amount that may be a service fee for providing the promotion and marketing service (e.g., $5). The remaining portion of the accepted value may then be determined as the merchant revenue share value.

At 722, the server may be configured to generate a second prepurchase promotion including at least one different promotion parameter than the (e.g., first) prepurchase promotion generated at 720. In some embodiments, the server may be configured to generate a plurality of different prepurchase promotions to offer consumers and/or merchants greater flexibility in the types of promotion parameters that are acceptable to each.

The plurality of prepurchase purchase parameters may each include a different item, promotional value, and/or accepted value. For example, two prepurchase promotions may include a different promotional value or discount, such as a first prepurchase promotion including a $5 accepted value for a $7.50 promotional value (e.g., 25% off) and a second prepurchase promotion including a $5 accepted value for a $10 promotional value (e.g., 50% off). In another example, two prepurchase promotions may include a different accepted value or discount, such as a first prepurchase promotion including a $10 accepted value for a $15.00 promotional value (e.g., 33% off) and a second prepurchase promotion including a $5 accepted value for a $15 promotional value (e.g., 66% off). In another example, two or more prepurchase promotions may additionally or alternatively include different item(s).

At 726, the server may be configured to generate a prepurchase impression including the prepurchase promotion and the second prepurchase promotion. The discussions at 304 and 404 of methods 300 and 400 may be applicable at 726. The prepurchase promotion and the second prepurchase promotion may include at least one different promotion parameter.

Some embodiments may provide for a user interface for generating a prepurchase promotion and/or determining the one or more promotion parameters (or "promotion options") and/or for determining the promotion parameters based on historical data of what is acceptable to merchants. Additional details regarding promotion options for promotions, applicable in some embodiments to the prepurchase promotions and/or promotion parameters discussed herein, are discussed in U.S. patent application Ser. No. 14/038,641, titled "Automated Deal Guide User Interface," filed Sep. 26, 2013, which is hereby incorporated by reference in its entirety and for all purposes. Method 700 may then proceed to 728 and end.

Many modifications and other embodiments will come to mind to one skilled in the art to which the embodiments discussed herein pertain having the benefit of the teachings presented in the foregoing descriptions and the associated drawings. Therefore, it is to be understood that the embodiments contemplated herein are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus, comprising:
    circuitry configured to:
        generate a merchant webpage based on merchant information retrieved from a database, wherein the merchant information is associated with a merchant device;
        in response to detecting a consumer device accessing the merchant webpage and determining that the merchant device is not associated with at least one available promotion, generate a prepurchase impression of a prepurchase promotion associated with the merchant device, the prepurchase promotion being associated with one or more promotion parameters including a promotional value, and the prepurchase impression includes a promotional value indication;
        transmit, via a network, the prepurchase impression of the prepurchase promotion to the consumer device;
        receive bid data from the consumer device indicating a consumer-defined accepted value and consumer acceptance of the one or more promotion parameters at the consumer-defined accepted value;
        retrieve a bid acceptance table from the database, wherein the bid acceptance table indicates at least a relationship between a plurality of consumer-defined accepted values and a plurality of bid acceptance likelihood values;
        determine a bid acceptance likelihood value associated with the consumer-defined accepted value based at least in part on the bid acceptance table;
        determine an expected revenue value associated with the prepurchase promotion based at least in part on the consumer-defined accepted value and the bid acceptance likelihood value;
        determine an expected revenue threshold value based on a minimum expected revenue value;
        determine that the expected revenue value satisfies the expected revenue threshold value;
        determine an internal minimum accepted value based on a threshold bid acceptance likelihood value;
        determine that the consumer-defined accepted value satisfies the internal minimum accepted value;
        in response to determining that the expected revenue value satisfies the expected revenue threshold value and that the consumer-defined accepted value satisfies the internal minimum accepted value, generate a promotion offer request including the one or more promotion parameters at the consumer-defined accepted value;
        transmit, via the network, the promotion offer request to the merchant device;
        subsequent to transmitting the promotion offer request to the merchant device, receive promotion data from the merchant device;
        generate a promotion based on the prepurchase promotion and the promotion data; and
        subsequent to generating the promotion:
            transmit, via the network, the promotion to the consumer device, and
            update the merchant webpage to include an impression of the promotion.

2. The apparatus of claim 1, wherein the circuitry is further configured to:
    determine a relationship between historical consumer-defined accepted values and historical bid acceptance likelihood values based on historical bid approval data, wherein determining the bid acceptance likelihood value associated with the consumer-defined accepted value is based at least in part on the relationship between the historical consumer-defined accepted values and the historical bid acceptance likelihood values; and
    subsequent to receiving the bid data from the consumer device indicating the consumer-defined accepted value, provide a bid acceptance likelihood value indication associated with the bid acceptance likelihood value to the consumer device.

3. The apparatus of claim 1, wherein the circuitry is further configured to:
    determine a relationship between historical consumer-defined accepted values and historical bid acceptance likelihood values based on historical bid approval data;
    determine a recommended consumer-defined accepted value based at least in part on the relationship between the historical consumer-defined accepted values and the historical bid acceptance likelihood values; and
    transmit a recommended consumer-defined accepted value indication associated with the recommended consumer-defined accepted value to the consumer device.

4. The apparatus of claim 1, wherein the circuitry is further configured to:
    determine a prepurchase threshold time associated with the merchant device;
    determine whether the promotion offer request is approved by the merchant device within the prepurchase threshold time; and
    in response to determining that the promotion offer request is not approved by the merchant device within the prepurchase threshold time, provide to the consumer device one or more of:
        a request for a second consumer-defined accepted value that is greater than the consumer-defined accepted value;
        a request for approval of a second prepurchase threshold time that is subsequent to the prepurchase threshold time; and
        an option to cancel the consumer acceptance of the one or more promotion parameters at the consumer-defined accepted value.

5. The apparatus of claim 1, wherein the circuitry is further configured to:
receive payment data from the consumer device; and
subsequent to generating the promotion, facilitate a financial transaction for the promotion based on the payment data and the consumer-defined accepted value.

6. The apparatus of claim 5, wherein the circuitry is further configured to:
store the payment data without facilitating the financial transaction until subsequent to determining that the consumer-defined accepted value satisfies a minimum accepted value.

7. The apparatus of claim 1, wherein the circuitry is further configured to:
generate a prepurchase queue including a plurality of consumer devices indicating consumer-defined accepted values satisfying a minimum accepted value;
ordering the prepurchase queue based on the consumer-defined accepted values;
determine a promotion availability value indicating a number of instances of the promotion available to consumer devices at the consumer-defined accepted values; and
subsequent to generating the promotion:
facilitate a financial transaction for the promotion for at least a portion of consumer devices within the prepurchase queue without exceeding the promotion availability value, wherein each financial transaction depletes an instance of the promotion available to consumer devices;
determine whether one or more instances of the promotion remain after facilitating the financial transaction for at least the portion of consumer devices; and
in response to determining that the one or more instances of the promotion remain, provide the impression of the promotion to consumer devices within the prepurchase queue other than at least the portion of consumer devices.

8. The apparatus of claim 1, wherein the circuitry is further configured to:
in response to determining that the expected revenue value exceeds the expected revenue threshold value, provide an alert to a display device of the apparatus or a second apparatus.

9. The apparatus of claim 1, wherein the circuitry is further configured to:
determine historical data associated with the prepurchase promotion indicating consumer-defined accepted values, bid counts associated with the consumer-defined accepted values, and bid acceptance likelihood values associated with the consumer-defined accepted values;
determine the expected revenue value of the prepurchase promotion based further on a portion of the historical data; and
in response to determining that the expected revenue value exceeds the expected revenue threshold value:
determine a merchant revenue share value based on the expected revenue value; and
provide an indication of the merchant revenue share value to the merchant device.

10. A machine-implemented method, comprising:
generating, by circuitry, a merchant webpage based on merchant information retrieved from a database, wherein the merchant information is associated with a merchant device;
in response to detecting a consumer device accessing the merchant webpage and determining that the merchant device is not associated with at least one available promotion, generating, by the circuitry, a prepurchase impression of a prepurchase promotion associated with the merchant device, the prepurchase promotion being associated with one or more promotion parameters including a promotional value, and the prepurchase impression includes a promotional value indication;
transmitting, by the circuitry and via a network, the prepurchase impression of the prepurchase promotion to the consumer device;
receiving, by the circuitry, bid data from the consumer device indicating a consumer-defined accepted value and consumer acceptance of the one or more promotion parameters at the consumer-defined accepted value;
retrieving, by the circuitry, a bid acceptance table from the database, wherein the bid acceptance table indicates at least a relationship between a plurality of consumer-defined accepted values and a plurality of bid acceptance likelihood values;
determining, by the circuitry, a bid acceptance likelihood value associated with the consumer-defined accepted value based at least in part on the bid acceptance table;
determining, by the circuitry, an expected revenue value associated with the prepurchase promotion based at least in part on the consumer-defined accepted value and the bid acceptance likelihood value;
determining, by the circuitry, an expected revenue threshold value based on a minimum expected revenue value;
determining, by the circuitry, that the expected revenue value satisfies the expected revenue threshold value;
determining an internal minimum accepted value based on a threshold bid acceptance likelihood value;
determining that the consumer-defined accepted value satisfies the internal minimum accepted value;
in response to determining that the expected revenue value satisfies the expected revenue threshold value and that the consumer-defined accepted value satisfies the internal minimum accepted value, generating, by the circuitry, a promotion offer request including the one or more promotion parameters at the consumer-defined accepted value;
transmitting, via the network, the promotion offer request to the merchant device;
subsequent to transmitting the promotion offer request to the merchant device, receiving promotion data from the merchant device;
generating a promotion based on the prepurchase promotion and the promotion data; and
subsequent to generating the promotion:
transmitting, via the network, the promotion to the consumer device, and
updating the merchant webpage to include an impression of the promotion.

11. The method of claim 10 further comprising, by the circuitry:
determining a relationship between historical consumer-defined accepted values and historical bid acceptance likelihood values based on historical bid approval data, wherein determining the bid acceptance likelihood value associated with the consumer-defined accepted value is based at least in part on the relationship between the historical consumer-defined accepted values and the historical bid acceptance likelihood values; and subsequent to receiving the bid data from the consumer device indicating the consumer-defined accepted value, providing a bid acceptance likelihood value indication associated with the bid acceptance likelihood value to the consumer device.

12. The method of claim 10 further comprising, by the circuitry:
   determining a relationship between historical consumer-defined accepted values and historical bid acceptance likelihood values based on historical bid approval data;
   determining a recommended consumer-defined accepted value based at least in part on the relationship between the historical consumer-defined accepted values and the historical bid acceptance likelihood values; and
   transmit a recommended consumer-defined accepted value indication associated with the recommended consumer-defined accepted value to the consumer device.

13. The method of claim 10 further comprising, by the circuitry:
   determining a prepurchase threshold time associated with the merchant device;
   determining whether the promotion offer request is approved by the merchant device within the prepurchase threshold time; and
   in response to determining that the promotion offer request is not approved by the merchant device within the prepurchase threshold time, providing to the consumer device one or more of:
      a request for a second consumer-defined accepted value that is greater than the consumer-defined accepted value;
      a request for approval of a second prepurchase threshold time that is subsequent to the prepurchase threshold time; and
      an option to cancel the consumer acceptance of the one or more promotion parameters at the consumer-defined accepted value.

14. The method of claim 10 further comprising, by the circuitry:
   receiving payment data from the consumer device; and
   subsequent to generating the promotion, facilitating a financial transaction for the promotion based on the payment data and the consumer-defined accepted value.

15. The method of claim 14 further comprising, by the circuitry:
   storing the payment data without facilitating the financial transaction until subsequent to determining that the consumer-defined accepted value satisfies a minimum accepted value.

16. The method of claim 10 further comprising, by the circuitry:
   generating a prepurchase queue including a plurality of consumer devices indicating consumer-defined accepted values satisfying a minimum accepted value;
   ordering the prepurchase queue based on the consumer-defined accepted values;
   determining a promotion availability value indicating a number of instances of the promotion available to consumer devices at the consumer-defined accepted values; and
   subsequent to generating the promotion:
      facilitating a financial transaction for the promotion for at least a portion of consumer devices within the prepurchase queue without exceeding the promotion availability value, wherein each financial transaction depletes an instance of the promotion available to consumer devices;
      determining whether one or more instances of the promotion remain after facilitating the financial transaction for at least the portion of consumer devices; and
      in response to determining that the one or more instances of the promotion remain, providing the impression of the promotion to consumer devices within the prepurchase queue other than at least the portion of consumer devices.

17. The method of claim 10 further comprising, by the circuitry:
   in response to determining that the expected revenue value exceeds the expected revenue threshold value, providing an alert to a display device.

18. The method of claim 10 further comprising, by the circuitry:
   determining historical data indicating consumer-defined accepted values, bid counts associated with the consumer-defined accepted values, and bid acceptance likelihood values associated with the consumer-defined accepted values;
   determining the expected revenue value of the prepurchase promotion based further on a portion of the historical data; and
   in response to determining that the expected revenue value exceeds the expected revenue threshold value:
      determining a merchant revenue share value based on the expected revenue value; and
      providing an indication of the merchant revenue share value to the merchant device.

19. A computer program product comprising a non-transitory computer readable storage medium and computer program instruction stored therein, the computer program instruction comprising program code for:
   generating, by circuitry, a merchant webpage based on merchant information retrieved from a database, wherein the merchant information is associated with a merchant device;
   in response to detecting a consumer device accessing the merchant webpage and determining that the merchant device is not associated with at least one available promotion, generating, by the circuitry, a prepurchase impression of a prepurchase promotion associated with the merchant device, the prepurchase promotion being associated with one or more promotion parameters including a promotional value and the prepurchase impression includes a promotional value indication;
   transmitting, by the circuitry and via a network, the prepurchase impression of the prepurchase promotion to the consumer device;
   receiving, by the circuitry, bid data from the consumer device indicating a consumer-defined accepted value and consumer acceptance of the one or more promotion parameters at the consumer-defined accepted value;
   retrieving, by the circuitry, a bid acceptance table from the database, wherein the bid acceptance table indicates at least a relationship between a plurality of consumer-defined accepted values and a plurality of bid acceptance likelihood values;
   determining, by the circuitry, a bid acceptance likelihood value associated with the consumer-defined accepted value based at least in part on the bid acceptance table;
   determining by the circuitry, an expected revenue value associated with the prepurchase promotion based at least in part on the consumer-defined accepted value and the bid acceptance likelihood value;
determining, by the circuitry, an expected revenue threshold value based on a minimum expected revenue value;
determining, by the circuitry, that the expected revenue value satisfies the expected revenue threshold value;
determining, by the circuitry, an internal minimum accepted value based on a threshold bid acceptance likelihood value;
determining, by the circuitry, that the consumer-defined accepted value satisfies the internal minimum accepted value;
in response to determining that the expected revenue value satisfies the expected revenue threshold value and that the consumer-defined accepted value satisfies the internal minimum accepted value, generating, by the circuitry, a promotion offer request including the one or more promotion parameters at the consumer-defined accepted value;
transmitting, by the circuitry and via the network, the promotion offer request to the merchant device;
subsequent to transmitting the promotion offer request to the merchant device, receiving, by the circuitry, promotion data from the merchant device;
generating, by the circuitry, a promotion based on the prepurchase promotion and the promotion data; and
subsequent to generating the promotion:
transmitting, by the circuitry and via the network, the promotion to the consumer device, and
updating, by the circuitry, the merchant webpage to include an impression of the promotion.

20. The apparatus of claim 1, wherein determining the expected revenue value associated with the prepurchase promotion is further based on a multiplication of the consumer-defined accepted value with the bid acceptance likelihood value.

21. The apparatus of claim 1, wherein the circuitry is configured to further:
subsequent to generating the promotion, facilitate a transaction for the promotion without an additional indication of consumer approval.

* * * * *